(12) United States Patent
Rahman et al.

(10) Patent No.: US 12,032,670 B2
(45) Date of Patent: Jul. 9, 2024

(54) VISUAL LOGIN

(71) Applicant: NETRADYNE, INC., San Diego, CA (US)

(72) Inventors: Hisham Rahman, Bengaluru (IN); Vinay Kumar Rai, Bengaluru (IN); Venkata Sreekanta Reddy Annapureddy, San Diego, CA (US); Badugu Naveen Chakravarthy, Bangaluru (IN); Satinder Singh, Bengaluru (IN); Roshan Mathews, Bengaluru (IN); Suresh Kumar Yerakaraju, Bengaluru (IN); Karthik Dumpala, Hyderabad (IN); Vishal Gupta, Bengaluru (IN); Ankur Nigam, Bengaluru (IN); Suresh Babu Yanamala, Bengaluru (IN); Adam David Kahn, San Diego, CA (US); James Anthony Curtis, Temecula, CA (US); Shravan Kumar Motuti, Hyderabad (IN); Arun Valiaparambil, Bengaluru (IN)

(73) Assignee: NETRADYNE, INC., San Diego, CA (US)

( * ) Notice: Subject to any disclaimer, the term of this patent is extended or adjusted under 35 U.S.C. 154(b) by 44 days.

(21) Appl. No.: 17/634,046

(22) PCT Filed: Nov. 10, 2021

(86) PCT No.: PCT/US2021/058791
§ 371 (c)(1),
(2) Date: Feb. 9, 2022

(87) PCT Pub. No.: WO2022/103846
PCT Pub. Date: May 19, 2022

(65) Prior Publication Data
US 2022/0237277 A1 Jul. 28, 2022

Related U.S. Application Data

(60) Provisional application No. 63/112,147, filed on Nov. 10, 2020, provisional application No. 63/191,476, filed on May 21, 2021.

(51) Int. Cl.
*G06F 21/32* (2013.01)
*B60W 40/08* (2012.01)
(Continued)

(52) U.S. Cl.
CPC ............. *G06F 21/32* (2013.01); *B60W 40/08* (2013.01); *G06V 10/762* (2022.01);
(Continued)

(58) Field of Classification Search
CPC ... B60W 2040/0809; B60W 2540/043; B60W 2540/215; G06V 10/774; G06V 10/82;
(Continued)

(56) References Cited

U.S. PATENT DOCUMENTS 8,881,251 B1 11/2014 Hilger
10,541,999 B1 * 1/2020 Rosenberg ........... G06V 40/172
(Continued)

FOREIGN PATENT DOCUMENTS

WO 2019209370 A1 10/2019

OTHER PUBLICATIONS

International Search Report and Written Opinion in International Patent Application No. PCT/US2021/058791 dated Jan. 31, 2022, 14 pages.

(Continued)

*Primary Examiner* — Jacob S. Scott
*Assistant Examiner* — Michael E Butler
(74) *Attorney, Agent, or Firm* — FOLEY & LARDNER LLP

(57) ABSTRACT

Systems and methods are provided for intelligent driving monitoring systems, advanced driver assistance systems and autonomous driving systems, and providing one-click driver image labeling to facilitate the assignment of drive time to a driver. Various aspects of the driver and/or passengers may be determined, which may include a driver identifier previously associated with the driver, whether the driver is wearing a facial covering, whether an image of the driver is (Continued)

partially occluded, whether the driver is facing in the direction of the camera, and whether an image of the driver is expected to be easily recognizable to a person tasked with assigning representative driver images to driver identifiers. These determinations may be used to improve the efficacy and ease-of-use of a visual login system.

13 Claims, 31 Drawing Sheets

(51) Int. Cl.
  *G06V 10/762* (2022.01)
  *G06V 10/774* (2022.01)
  *G06V 10/82* (2022.01)
  *G06V 20/59* (2022.01)
  *G06V 40/16* (2022.01)
(52) U.S. Cl.
  CPC ............ *G06V 10/774* (2022.01); *G06V 10/82* (2022.01); *G06V 20/59* (2022.01); *G06V 40/172* (2022.01); *B60W 2040/0809* (2013.01); *B60W 2540/043* (2020.02); *B60W 2540/215* (2020.02)
(58) Field of Classification Search
  CPC .... G06V 40/172; G06V 10/762; G06V 20/59; G06F 21/32
  USPC .......................................................... 713/86
  See application file for complete search history.

(56) References Cited

U.S. PATENT DOCUMENTS

| | | |
|---|---|---|
| 2006/0208169 A1* | 9/2006 | Breed ................... G01S 7/4802 250/221 |
| 2010/0008550 A1* | 1/2010 | Dinerstein ........... G06K 9/6253 382/118 |
| 2012/0148117 A1 | 6/2012 | Chang |
| 2013/0073114 A1 | 3/2013 | Nemat-Nasser et al. |
| 2013/0156275 A1 | 6/2013 | Amacker et al. |
| 2014/0325223 A1* | 10/2014 | Turgeman ............... G06F 21/31 713/168 |
| 2015/0379331 A1 | 12/2015 | Nemat-Nasser et al. |
| 2018/0314816 A1* | 11/2018 | Turgeman ............... G06F 21/40 |
| 2018/0349683 A1* | 12/2018 | Mathieu ............... G06V 40/197 |
| 2019/0050657 A1 | 2/2019 | Gleeson-May et al. |
| 2019/0213816 A1* | 7/2019 | Grigorov ................. G07C 9/37 |
| 2020/0057487 A1 | 2/2020 | Sicconi et al. |
| 2020/0152030 A1* | 5/2020 | Roth ................ G08B 13/19628 |
| 2020/0401791 A1* | 12/2020 | Gao ........................ G06N 20/00 |
| 2021/0229674 A1* | 7/2021 | Anikin .................. B60W 40/09 |

OTHER PUBLICATIONS

Extended European Search Report in EP Patent Application No. 21892732.5 dated Jan. 29, 2029, 11 pages.

* cited by examiner

Add a New Driver

202 — Driver ID * ⓘ
NO98745

208 — ⓒ Add Profile Photo

204 — First Name *
Steve

Last Name
[ ] — 210

Phone Number
[ ]

License Number
US12345

Email *
Steve@xyz.com

206 — Username * ⓘ
nd_steve

Does this driver plan to use the Driver™ Mobile App?
⦿ Yes  ○ No

[ Add Driver ]

Edit Vehicle Association
Vehicle Number
ND56550 ← 302

Device

Select a device to associate to this vehicle*
16314411 ▽ — 304

When was this device installed in the vehicle?* ⓘ
2019-10-03
12:30:00

Driver (optional)

In some fleets, drivers have vehicles assigned to them. You may associate vehicles to drivers as well, If your fleet falls in this category Select a driver to associate to this vehicle John Walker #01John ▽ — 306

[ Save ]

FIG. 3

| Threshold | Face Mask Absent Percentage |
|---|---|
| 0.7 | 58.2% |
| 0.8 | 49.5% |
| 0.9 | 31.6% |
| 0.95 | 16.7% |

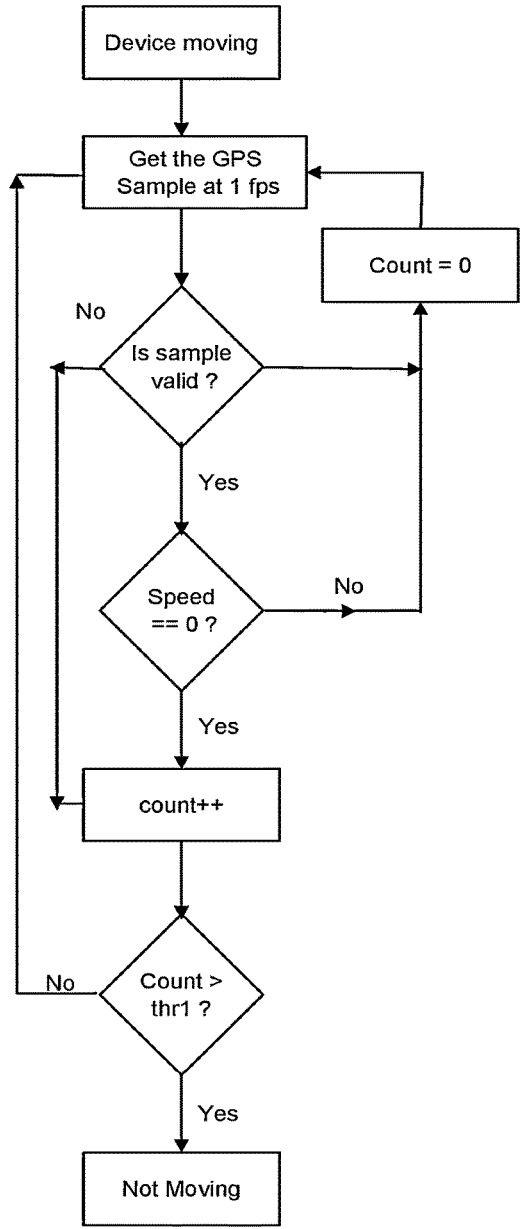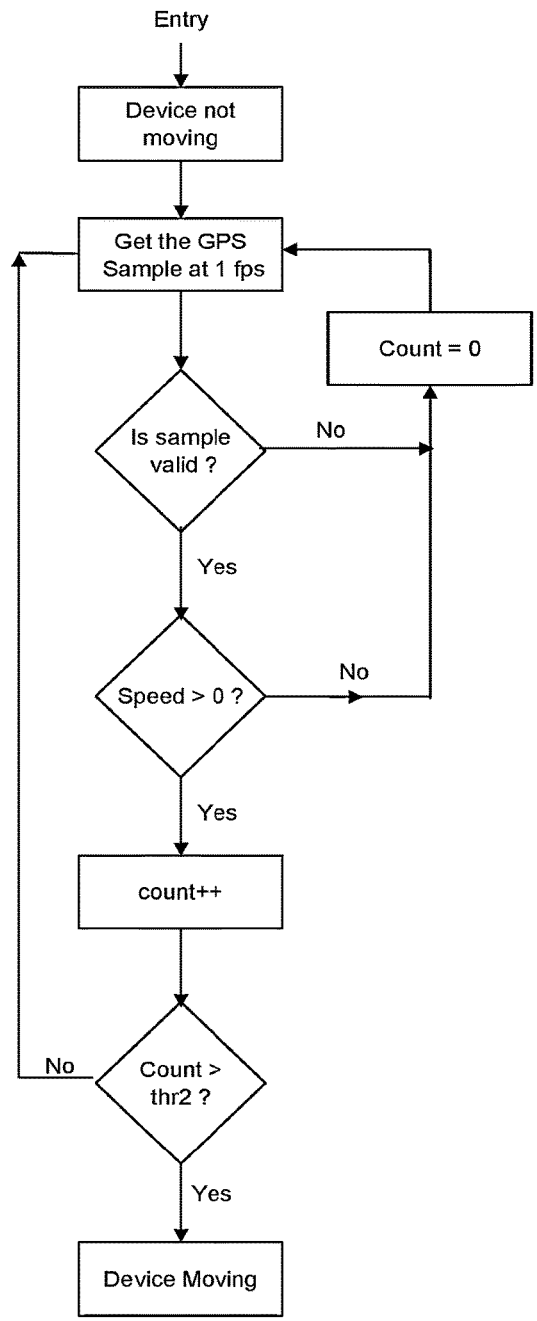
FIG. 25B
FIG. 25C

VISUAL LOGIN

CROSS REFERENCE TO RELATED APPLICATIONS

This application is a U.S. National Phase Application under 35 U.S.C. § 371 of International Application No. PCT/US21/58791, filed on Nov. 10, 2021, which claims the benefit of and priority to U.S. Provisional Application No. 63/112,147, filed on Nov. 10, 2020, and U.S. Provisional Patent Application No. 63/191,476, filed on May 21, 2021, the contents of which are incorporated herein by reference in their entireties.

BACKGROUND

Field

Certain aspects of the present disclosure generally relate to Intelligent Driving Monitoring Systems (IDMS), driver monitoring systems, Advanced Driver Assistance Systems (ADAS), and autonomous driving systems, and more particularly to systems and methods for associating drive time of a vehicle to a driver.

Background

Vehicles, such as ride-share passenger cars, delivery vans, and trucks, are typically operated and controlled by human drivers. Through training and with experience, a human driver may learn how to drive a vehicle safely and efficiently in a range of conditions or contexts. For example, as an automobile driver gains experience, he may become adept at driving in challenging conditions such as rain, snow, or darkness.

IDMS, driver monitoring, and ADAS systems may monitor human drivers as they operate a vehicle. Such systems may provide warnings to a driver, may enable safety metrics concerning the driver's behavioral trends, efficiency metrics, and the like. When applied to a vehicle fleet, driver metrics may be used to identify unsafe drivers, safe drivers, efficient drivers, and the like.

A persistent problem with IDMS, driver monitoring, and ADAS systems, particularly in the context of vehicles that are often driven by more than one driver, relates to the accurate and robust association of vehicle drive time to the correct driver. While systems and technologies exist with which a driver may log in to a vehicle at the start of a driving shift, such systems and technologies often suffer from a variety of issues that inhibit their accuracy. In some cases, the issues stem from driver error, because a driver may log in to the vehicle incorrectly or may forget to log in altogether. In other cases, drive time association issues stem from subtle backend issues, such as cellular network coverage gaps that may frustrate communication between a login device and a remote server. In addition, system and technologies for drive time assignment may entail substantial upfront investments, including hardware installation in vehicles and hardware provisioning to new drivers.

As shared-vehicle ownership models become more prevalent, as delivery vehicle companies quickly grow, and the like, certain problems relating to the correct association of drive time to a driver have become more pronounced. Accordingly, certain aspects of the present disclosure are directed to systems and methods of associating drive time to a driver that may enable substantially automatic, camera-based login to a vehicle, so that such systems may be more effective, personalized, and useful. In addition, certain aspects of the present disclosure are directed to systems and methods of authenticating a driver that protect privacy.

SUMMARY

Certain aspects of the present disclosure generally relate to providing, implementing, and using a method of assigning drive time to a driver. The method generally includes receiving, by at least one processor of a computing device, one or more driver identifiers, wherein each driver identifier corresponds to a driver who is associated with a vehicle fleet; receiving, by the at least one processor, a plurality of driver images of a first driver, wherein each driver image of the plurality was captured by camera mounted to a vehicle, wherein the vehicle is in the vehicle fleet; displaying, by the at least one processor and to a user: a representative image of the first driver from the plurality of driver images; and the one or more driver identifiers. The method further includes: receiving, by the at least one processor, input data from the user, wherein the input data indicates a selected driver identifier from the one or more driver identifiers; and associating, by the at least one processor, the selected driver identifier with every driver image of the plurality of driver images of the first driver including the representative image.

Certain aspects of the present disclosure provide a computer program. The computer program generally includes: a non-transitory computer-readable medium having program code recorded thereon, the program code, when executed by a processor, causes the processor to: receive one or more driver identifiers, wherein each driver identifier corresponds to a driver who is associated with a vehicle fleet; receive a plurality of driver images of a first driver, wherein each driver image of the plurality was captured by camera mounted to a vehicle, wherein the vehicle is in the vehicle fleet; display to a user: a representative image of the first driver from the plurality of driver images; and the one or more driver identifiers; receive input data from the user, wherein the input data indicates a selected driver identifier from the one or more driver identifiers; and associate the selected driver identifier with every driver image of the plurality of driver images of the first driver including the representative image.

Certain aspects of the present disclosure general relate to providing, implementing, and using a visual login system. The system generally includes: a base model that produces an embedding space projection based on a driver image; and a fleet-specific model that determines a probability of a match to one or more of a pre-determined list of driver identifiers based on the embedding space projection.

Certain aspects of the present disclosure generally relate to providing, implementing, and using a method of assigning drive time to a driver. The method generally includes: receiving, by at least one processor of a computing device, a plurality of images, including a first image captured at a first time and a second image captured at a second time by a camera mounted in a vehicle, wherein a field of view of the camera includes a portion of an interior of the vehicle; determining, by at least one processor, a plurality of embedding locations, each embedding location of the plurality of embedding locations corresponding to an image of the plurality of images; clustering, by at least one processor, the plurality of embedding locations to produce driver-image clusters, so that each cluster of the driver-image clusters contains embedding locations corresponding to only one driver, and wherein the first image is associated with a first driver-image cluster and the second image is associated with a second driver-image cluster; receiving, by at least one processor, data identifying a driver-invariant session for which the vehicle was driven by only one driver for a span of time, wherein the span of time comprises the first time and the second time; and linking, by at least one processor, the first driver-image cluster and the second driver-image cluster based on: the association of the first image with the first driver-image cluster; the association of the second image with the second driver-image cluster; and the driver-invariant session data.

Certain aspects of the present disclosure provide an apparatus. The apparatus generally includes a memory unit; at least one processor coupled to the memory unit, in which the processor is generally configured to: receive, by at least one processor of a computing device, a plurality of images, including a first image captured at a first time and a second image captured at a second time by a camera mounted in a vehicle, wherein a field of view of the camera includes a portion of an interior of the vehicle; determine, by at least one processor, a plurality of embedding locations, each embedding location of the plurality of embedding locations corresponding to an image of the plurality of images; cluster, by at least one processor, the plurality of embedding locations to produce driver-image clusters, so that each cluster of the driver-image clusters contains embedding locations corresponding to only one driver, and wherein the first image is associated with a first driver-image cluster and the second image is associated with a second driver-image cluster; receive, by at least one processor, data identifying a driver-invariant session for which the vehicle was driven by only one driver for a span of time, wherein the span of time comprises the first time and the second time; and link, by at least one processor, the first driver-image cluster and the second driver-image cluster based on: the association of the first image with the first driver-image cluster; the association of the second image with the second driver-image cluster; and the driver-invariant session data.

Certain aspects of the present disclosure provide a computer program. The computer program generally includes: a non-transitory computer-readable medium having program code recorded thereon, the program code, when executed by a processor, causes the processor to: receive, by at least one processor of a computing device, a plurality of images, including a first image captured at a first time and a second image captured at a second time by a camera mounted in a vehicle, wherein a field of view of the camera includes a portion of an interior of the vehicle; determine, by at least one processor, a plurality of embedding locations, each embedding location of the plurality of embedding locations corresponding to an image of the plurality of images; cluster, by at least one processor, the plurality of embedding locations to produce driver-image clusters, so that each cluster of the driver-image clusters contains embedding locations corresponding to only one driver, and wherein the first image is associated with a first driver-image cluster and the second image is associated with a second driver-image cluster; receive, by at least one processor, data identifying a driver-invariant session for which the vehicle was driven by only one driver for a span of time, wherein the span of time comprises the first time and the second time; and link, by at least one processor, the first driver-image cluster and the second driver-image cluster based on: the association of the first image with the first driver-image cluster; the association of the second image with the second driver-image cluster; and the driver-invariant session data.

Certain aspects of the present disclosure generally relate to providing, implementing, and using a method of assigning drive time to a driver. The method generally includes: receiving a driver image, wherein the image was captured by a camera having a view of an interior of a vehicle; computing an embedding location within an embedding space based on the driver image; computing a driver classification based at least in part on the embedding location; computing a distance between the embedding location and a cluster within the embedding space, wherein the cluster is associated with the driver classification; and determining whether to accept the driver classification of the image based on the distance.

Certain aspects of the present disclosure provide an apparatus. The apparatus generally includes a memory unit; at least one processor coupled to the memory unit, in which the processor is generally configured to: receive a driver image, wherein the image was captured by a camera having a view of an interior of a vehicle; compute an embedding location within an embedding space based on the driver image; compute a driver classification based at least in part on the embedding location; compute a distance between the embedding location and a cluster within the embedding space, wherein the cluster is associated with the driver classification; and determine whether to accept the driver classification of the image based on the distance.

Certain aspects of the present disclosure provide a computer program. The computer program generally includes: a non-transitory computer-readable medium having program code recorded thereon, the program code, when executed by a processor, causes the processor to: receive a driver image, wherein the image was captured by a camera having a view of an interior of a vehicle; compute an embedding location within an embedding space based on the driver image; compute a driver classification based at least in part on the embedding location; compute a distance between the embedding location and a cluster within the embedding space, wherein the cluster is associated with the driver classification; and determine whether to accept the driver classification of the image based on the distance.

BRIEF DESCRIPTION OF DRAWINGS

FIG. 2 illustrates an interface to add a driver-identifier in accordance with certain aspects of the present disclosure.

FIG. 3 illustrates an interface to associate a driver-identifier with a vehicle in accordance with certain aspects of the present disclosure.

FIG. 25B illustrates GPS usage for detection of motion to stationary in accordance with certain aspects of the present disclosure.

FIG. 25C illustrates GPS usage for detection of stationary to motion in accordance with certain aspects of the present disclosure.

DETAILED DESCRIPTION

Figure 1A:
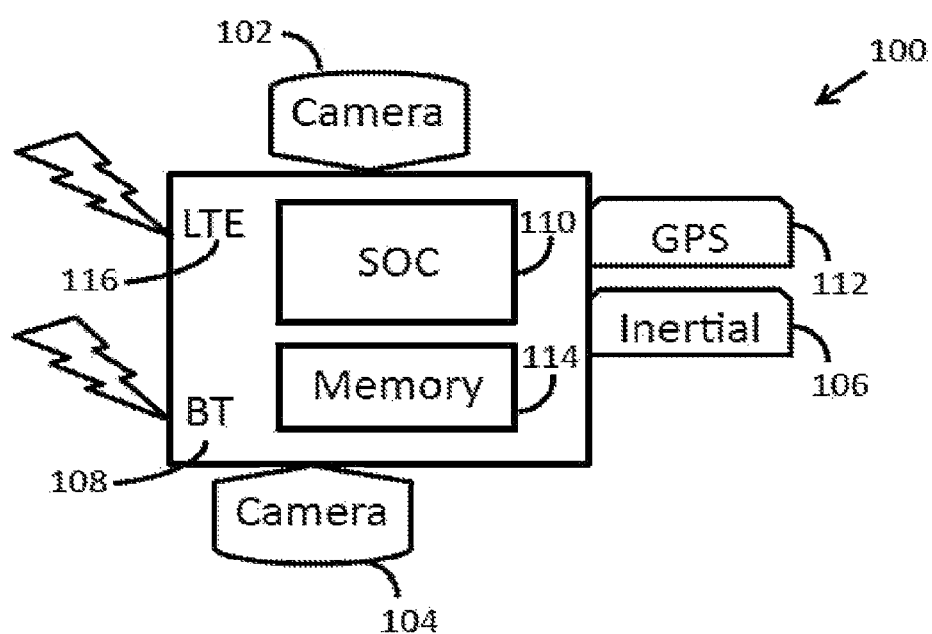
FIG. 1A illustrates a block diagram of an example system for visual login.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. Any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, and system configurations, some of which are illustrated by way of example in the figures and in the following description of the preferred aspects. The detailed description and drawings are merely illustrative of the disclosure rather than limiting, the scope of the disclosure being defined by the appended claims and equivalents thereof.

Monitoring and Characterization of Driver Behavior

Driving behavior may be monitored. Driver monitoring may be performed in real time or substantially real time as a driver operates a vehicle or may be done at a later time based on recorded data. Driver monitoring at a later time may be useful, for example, when investigating the cause of an accident, or to provide coaching to a driver. Driver monitoring in real time may be useful to guard against unsafe driving, for example, by ensuring that a car cannot exceed a certain pre-determined speed.

Aspects of the present disclosure are directed to methods of monitoring and characterizing driver behavior, which may include methods of determining and/or providing alerts to an operator of a vehicle and/or transmitting remote alerts to a remote driver monitoring system. Remote alerts may be transmitted wirelessly over a wireless network to one or more servers and/or one or more other electronic devices, such as a mobile phone, tablet, laptop, desktop, etc., such that information about a driver and objects and environments that a driver and vehicle encounters may be documented and reported to other individuals (e.g., a fleet manager, insurance company, etc.). An accurate characterization of driver behavior has multiple applications. Insurance companies may use accurately characterized driver behavior to influence premiums. Insurance companies may, for example, reward risk-mitigating behavior and dis-incentivize behavior associated with increased accident risk. Fleet owners may use accurately characterized driver behavior to incentivize their drivers. Likewise, taxicab aggregators may incentivize taxicab driver behavior. Taxicab or ride-sharing aggregator customers may also use past characterizations of driver behavior to filter and select drivers based on driver behavior criteria. For example, to ensure safety, drivers of children or other vulnerable populations may be screened based on driving behavior exhibited in the past. Parents may wish to monitor the driving patterns of their kids and may further utilize methods of monitoring and characterizing driver behavior to incentivize safe driving behavior.

FIG. 1A illustrates an embodiment of the aforementioned system for driving and/or driver monitoring and visual login for a vehicle operator. The device 100 may include input sensors (which may include a forward-facing camera 102, a driver facing camera 104, connections to other cameras that are not physically mounted to the device, inertial sensors 106, car OBD-II port sensor data (which may be obtained through a Bluetooth connection 108), and the like) and compute capability 110. The compute capability may be a CPU or an integrated System-on-a-chip (SOC), which may include a CPU and other specialized compute cores, such as a graphics processor (GPU), gesture recognition processor, and the like. In some embodiments, a system for determining, transmitting, and/or providing alerts to an operator of a vehicle and/or a device of a remote driver monitoring system may include wireless communication to cloud services, such as with Long Term Evolution (LTE) 116 or Bluetooth communication 108 to other devices nearby. For example, the cloud may provide real-time analytics assistance. In an embodiment involving cloud services, the cloud may facilitate aggregation and processing of data for offline analytics. The device may also include a global positioning system (GPS) either as a separate module 112 or integrated within a system-on-a-chip 110. The device may further include memory storage 114.

Figure 1B:
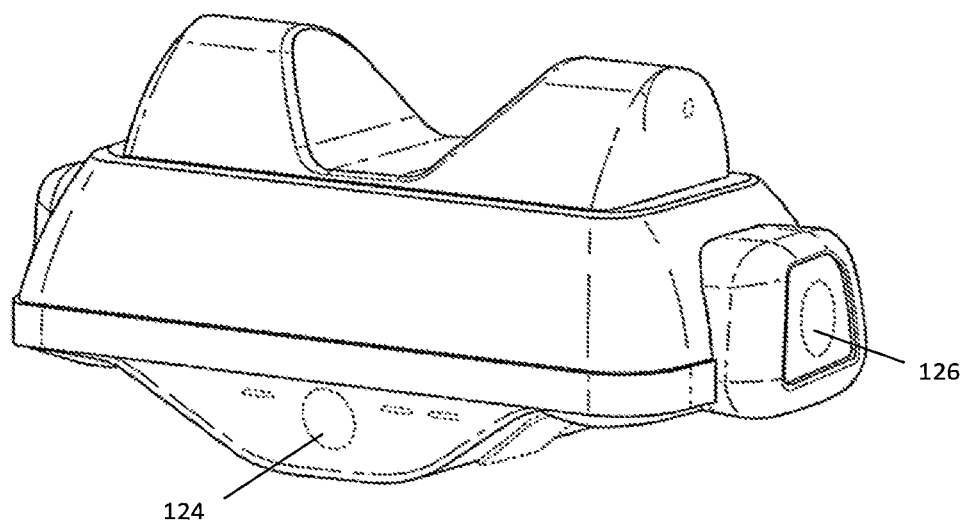
FIG. 1B illustrates a front-perspective view of an example camera device for capturing images of an interior of a vehicle and/or an outward scene of a vehicle in accordance with certain aspects of the present disclosure.
Figure 1C:
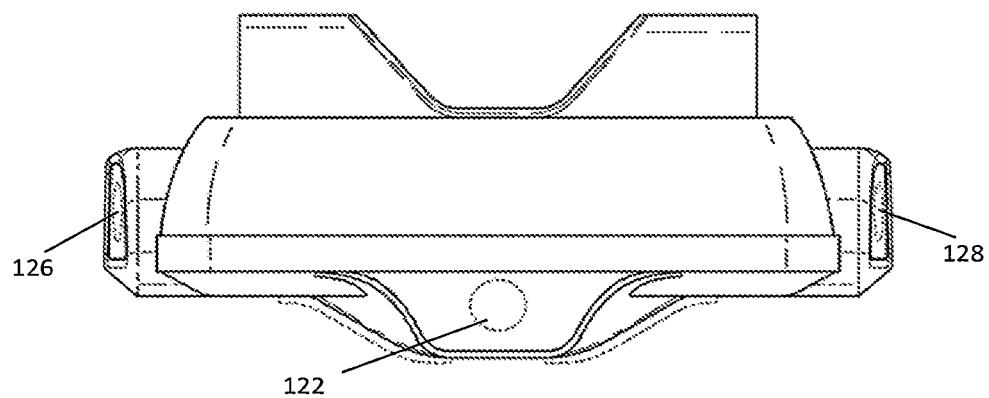
FIG. 1C illustrates a rear view of the example camera device of FIG. 1B in accordance with certain aspects of the present disclosure.

FIG. 1B illustrates an embodiment of a device with four cameras in accordance with the aforementioned devices, systems, and methods of driving and/or driver monitoring and visual login for a vehicle operator. FIG. 1B illustrates a front-perspective view. FIG. 1C illustrates a rear view. The device illustrated in FIG. 1B and FIG. 1C may be affixed to a vehicle and may include a front-facing camera aperture 122 through which an image sensor may capture video data (e.g., frames or visual data) from the road ahead of a vehicle (e.g., an outward scene of the vehicle). The device may also include an inward-facing camera aperture 124 through which an image sensor may capture video data (e.g., frames or visual data) from the internal cab of a vehicle. The inward-facing camera may be used, for example, to monitor the operator/driver of a vehicle. The device may also include a right camera aperture 126 through which an image sensor may capture video data from the right side of a vehicle operator's Point of View (POV). The device may also include a left camera aperture 128 through which an image sensor may capture video data from the left side of a vehicle operator's POV. The right and left camera apertures 126 and 128 may capture visual data relevant to the outward scene of a vehicle (e.g., through side windows of the vehicle, images appearing in the passenger or driver side mirror, rear-view mirrors, etc.) and/or may capture visual data relevant to the inward scene of a vehicle (e.g., a part of the driver/operator, other objects or passengers inside the cab of a vehicle, objects or passengers with which the driver/operator interacts, etc.).

A system for driving and/or driver monitoring and visual login for an operator of a vehicle, in accordance with certain aspects of the present disclosure, may assess the driver's behavior in several contexts and perhaps using several metrics. The system may include sensors, profiles, sensory recognition and monitoring modules, assessment modules, and may produce an overall grade. Contemplated driver assessment modules include speed assessment, safe following distance, obeying traffic signs and lights, safe lane changes and lane position, hard accelerations including turns, responding to traffic officers, responding to road conditions, and responding to emergency vehicles. Each of these exemplary features is described in International Patent Application No. PCT/US17/13062, entitled "DRIVER BEHAVIOR MONITORING", filed 11 Jan. 2017, which is incorporated herein by reference in its entirety.

In an embodiment of certain aspects of the present disclosure, an individual driver may be registered with a fleet. FIG. 2 illustrates an interface by which a user may input various text and/or image data to create a new driver profile. A user, who may be a safety manager for a fleet, an owner of a delivery fleet business, and the like, may input various driver-identifier strings, such as a Driver ID 202, a First Name 204, a Last Name 210, and/or a username 206. In some embodiments, a user may have an option to add a profile photo 208.

While FIG. 2 illustrates an interface by which a user may add an individual driver, a system enabled with certain aspects of the present disclosure may include interfaces and methods of importing several driver profiles together. For example, a user may specify a comma-separated value file containing one or more of: Driver ID, First Name, Last Name, username, or driver-identifier strings. The file containing these data types may include multiple rows, for example, each row corresponding to one driver, such that multiple drivers may be registered by way of a file upload.

In addition, a file containing driver identifier information, such as a comma-separated value file, may further contain a vehicle identifier, such as a vehicle number, to associate the driver with a vehicle as part of a driver registration process. Likewise, in some embodiments, a vehicle may be assigned to a registered driver using, for example, an interface such as the interface illustrated in FIG. 3. The interface illustrated in FIG. 3 may be accessed by a user after the user has added or registered one or more drivers. In some embodiments, the interface may display a vehicle-identifier 302 corresponding to a vehicle in the fleet. The interface may further include a drop-down menu 304 with which a user may select a device ID. The list of device IDs that are available in the drop-down menu 304 may include IDMS devices that have been installed into vehicles in the fleet. Using as interface, such as the one illustrated in FIG. 3, a user may associate an installed device with the vehicle in or on which the device has been or will be installed. In some embodiments, a user may further associate a driver to the vehicle and/or device. For example, a fleet manager may select a driver-identifier, such as a Driver ID 202, from a drop-down menu 306 of registered drivers.

A fixed association between a vehicle and a driver may be appropriate for fleets for which a vehicle is driven by only one driver and for which the driving monitoring device is rigidly installed within the vehicle. A stable association between a vehicle and only one driver may be common for long-haul trucking fleets, for example, or at least such a fleet that employs individual (not team) drivers. For these fleets, the problem of properly associating drive time to the correct driver may be satisfactorily addressed in the manner illustrated by FIG. 3, which illustrates an option to manually associate drivers and particular vehicles (which may be considered the same as an association between a driver and a particular device when the device is installed in or on the vehicle). If the vehicle is only driven by one driver, and the device installed within the vehicle is not moved to a different vehicle, the association of the vehicle to the driver will result in an accurate mapping of the vehicle and the vehicle-installed device that may be capable of analyzing driving behavior to the driver whose behavior is analyzed by the device. There may be many other fleet scenarios, however, for which these conditions do not hold. Accordingly, various other techniques for associating a driver to a drive time are addressed below. Enabled with certain aspects of the present disclosure, the benefit of reliably associating a driver with drive time may be realized.

Sources of Driver Login Data

According to certain aspects, drive time may be associated with a driver by using information from multiple sources. Different sources of driver assignment information may include: Vehicle Association Based Assignment; Visual Login Based Assignment; Physical Beacon Based Assignment; App Based Assignment; ELD based assignment; And Manual Drive Time association.

A vehicle-based assignment, as described above, may refer to a driver time assignment for which all drive time from the vehicle is assigned to the specified driver. In some embodiments, a vehicle-based assignment may be a default setting, such that an assignment based on the vehicle may be superseded by an assignment based on a different source of driver login data.

A Visual Login System (VLS), according to certain aspects disclosed herein, may detect and/or authenticate a driver of a vehicle by processing an image that contains at least a portion of the driver's face or torso. In some embodiments, a VLS may be configured to process images captured by an inward facing camera having a view of the interior of a vehicle.

A physical beacon-based assignment may rely on a physical beacon. Each beacon may be assigned to one driver who then carries the beacon while driving.

An app-based assignment may refer to a passive or active login mechanism that relies on a device held, carried, worn, etc., by the driver. When the app is passive, the app may be considered comparable to other physical beacon-based login methods and system. When the app is active, the app may provide a way for a candidate driver to acknowledge that he or she is driving and/or has stopped driving, as described in more detail below.

An Electronic Logging Device (ELD) may be hardware that is used with commercial motor vehicles to record a driver's hours of service as regulated by the US Federal Motor Carrier Safety Administration. In ELD-based login, the driver's drive time is logged in an ELD database. The driver updates his or her Hours of Service (HOS) in the ELD and the data is uploaded to servers. These data may then be mapped to Drive Time of a particular vehicle using a vehicle ID that is logged, for example, by an IDMS device.

Manual Driver Time association may refer to an act by a Safety Manager to assign unknown drive time to a driver, or to merge, split, invalidate, or reassign assigned drive time so that it is assigned to the correct driver. Based on these driver assignments, the driver login details may be identified. In some embodiments, details of a driver login may be changed by uploading a CSV file with details or by performing inline edits for any known or unknown drive time. The unknown drive time is thus manually assigned to a driver. In some embodiments, a change in a drive time assignment may affect a GreenZone Score, Coaching Session, Alerts, etc. of the selected driver and/or the driver that had been previously associated with the driver time.

The relative importance of each source of driver login data may depend on which types of login data are available, as well as characteristics of the fleet, such as whether the fleet is an Over-The-Road operator that is typically engaged in hauling freight over long distances. In some embodiments, the different sources of driver login data may be hierarchically related to each other, such that one source of driver login data may override another in the case of a conflict. For example, a manual assignment may override any other conflicting drive time assignment, based on the premise that a manual assignment is inherently verified by a human operator. In another example, a vehicle-based assignment may be overwritten by any other conflicting drive time assignment, based on the premise that a static vehicle-based assignment may be considered a default drive time assignment technique.

App-Based Login, ELD, and Errors Relating to Team Drivers

According to certain aspects, drivers in a fleet may install an app, such as a smartphone app, smart watch app, and the like, onto a device which they tend to carry or wear. If a driver tends to carry a smartphone, for example, the driver may download an app like the one illustrated in FIG. 4 and may use that app to perform a driver login at the start of each driving session. Likewise, a driver who tends to wear a smart watch may enable a similar app that is adapted for a smart watch and may perform a driver login in a similar manner. In some embodiments, an app may perform multiple driver logins throughout a driving session.

Figure 4:
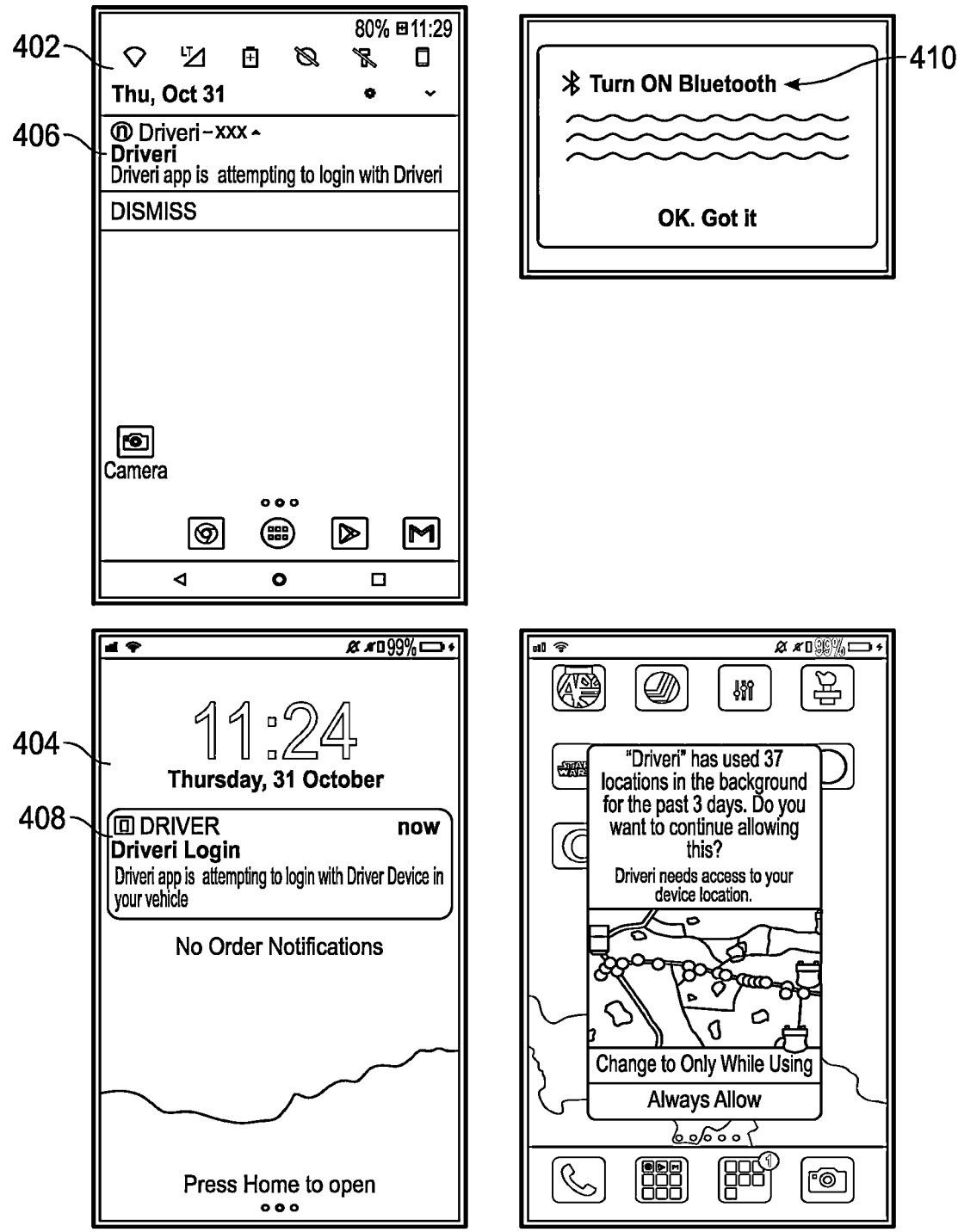
FIG. 4 illustrates examples of a smartphone app configured to enable driver login for the driver carrying the smartphone in accordance with certain aspects of the present disclosure.

FIG. 4 illustrates an embodiment of certain aspects of the present disclosure that incorporate a smartphone app as seen in an Android smartphone display 402 or in an iPhone smartphone display 404. In the Android smartphone display 402, a notification 406 from the smartphone app indicates that the app is attempting to login with an AI camera (i.e., the device that is installed in the vehicle), in this case a Driveri AI camera produced by Netradyne, Inc. Similarly, the iPhone smartphone display 404 may display a notification 408 when the app attempts to log into an IDMS device, ADAS device, and the like.

As illustrated in FIG. 4, a driver can use a smartphone app to automatically perform a Driver Login. The vehicle-mounted driving monitoring device may automatically detect the driver's details based on the login credentials used in the app. As such, other than initially (or periodically) logging into the app using valid credentials, the driver using the smartphone app may automatically log in for a driving session without an attendant need to input any information. This may be referred to as a passive login mechanism.

In accordance with certain aspects, the driver/driving monitoring and/or driver assist device (which may be referred to as a "Driveri device") may scan for a proximate Driveri App at the beginning of each trip when the vehicle attains a certain predetermined speed, such as 15 mph. A choice of threshold speed may impact the performance of the automatic app-based login system. In some embodiments, the device may scan for a limited number of minutes, such as ten minutes, after the vehicle first attains the threshold speed, as this may conserve resources on the device, the smartphone to which it is attempting to connect, or both. In such embodiments, if Bluetooth is not enabled on the target smartphone during this pre-defined period, the device may stop issuing Bluetooth scans before a successful login.

In some embodiments, a Driveri device may associate a driver with driving data from the time of a successful login until the vehicle becomes stationary. After a determination is made by the device that the vehicle has become stationary, the system may restart a login process the next time the vehicle is driven above the threshold speed. In this way, the system may allocate its power budget to time periods when it is possible that a new driver has taken control of the vehicle. For restarting a login process, a determination that the vehicle has become stationary may consider factors such as how long a vehicle typically waits at a red-light intersection, such that the vehicle is determined to become stationary if the vehicle does not move for a multiple of such typical stoppage times. In one example, a stoppage of more than three times the duration of a typical red-light intersection stoppage time may cause the Driveri to "forget" the previously logged in driver. In another example, a stoppage of more than three minutes may cause the Driveri to forget the previously logged in driver.

While the smartphone app login systems illustrated in FIG. 4 have the potential to enable completely passive login, and thus, avoid errors associated with the driver forgetting to manually log into an Electronic Logging Device (ELD) and the like, a smartphone app enabled with certain aspects of the present disclosure may also request input from the driver.

In the example embodiments just described, for example, a Driveri App may use Bluetooth communication protocols to connect with a Driveri device that may be mounted in a vehicle. In a typical embodiment, the Driveri device may initiate the connection, because the Driveri device may be expected to be powered down (at least for long periods) when the vehicle is not being driven, and so a typical login time may occur shortly after the Driveri device is powered on. In some embodiments, the Driveri device may broadcast Bluetooth signals upon detecting that the driver's door has opened (which may be detected based on monitoring of CAN messages, as described below), that a driver has transitioned the vehicle out of neutral, that the vehicle has begun to travel in the forward direction for at least a threshold distance, that the vehicle is moving above at least a threshold speed, after an audio sensor has detected a spoken wake-up command, and the like.

Upon initiating a login, the Driveri device may await a response signal from the driver's smartphone app. If the driver's smartphone is proximate to the Driveri device, such as would be expected when sitting in a driver seat of the vehicle having the Driveri device installed, the smartphone would be within range of even a short-range Bluetooth communication signal. A problem may arise, however, if the smartphone operating system is not receiving Bluetooth communication signals at the time when the Driveri device is attempting to initiate a login. Smartphone operating systems may disable Bluetooth communications for a variety of reasons, including privacy, security, and battery preservation. Because the smartphone app in this example relies on Bluetooth communication, the smartphone app may preemptively cause the smartphone operating system to alert the driver if Bluetooth communication is disabled. For example, the smartphone may display an alert 410 requesting that the driver enable Bluetooth on his or her smartphone device.

According to certain aspects, the smartphone app may be configured to check the status of Bluetooth communications on the smartphone at certain times of day or in certain locations that are associated with the start of a driving trip. For example, if the driver tends to begin driving between 5:30 and 6:30 am on weekdays, the smartphone app may check the status of Bluetooth communications at 5:15 am on weekdays. If, at that time, Bluetooth communications have been disabled, the smartphone app may cause the smartphone to notify the driver and request that the driver enable Bluetooth. Likewise, the smartphone app may check the status of Bluetooth communications soon after the driver arrives at a location (such as a shipping facility), where driving trips tend to originate. By checking the Bluetooth status at certain times or locations, the smartphone app may cause a timely "Turn ON Bluetooth" notification 410 that may rescue the functioning of the Bluetooth-based login protocol, but at the same time conserve smartphone resources and refrain from annoying the driver at times when it is unlikely that the driver will begin to drive.

A smartphone operating system may in some instances attempt to persuade a driver to downgrade permissions for an app, such that the app may not work as planned for the purpose of Driver Login. The Apple iOS, for example, generates alerts about locations used by the app, as displayed in FIG. 5. The iOS alert may appear at any time on the home screen or over any other app, and provide an option to change location permission for the Driveri App. In some versions, the iOS alert notification may depict a map that represents the number of times the location was tracked by the smartphone app and may display the information along with selectable buttons that would continue to allow background processing (and therefore that would enable app-based login), or alternatively change permissions granted to the app. In some cases, a driver may inadvertently select an option that prevents the Driveri device detection by the Driveri App, and thus prevent app-based login.

Because the proper functioning of the smartphone app-based login system may depend on Bluetooth, and because a continuous scan for Bluetooth connections may be impractical (or even disallowed by a smartphone operating system), the driver login system may fail or perform poorly at certain times. A dependency on Bluetooth, therefore, may be a source of inaccuracy for a smartphone-based driver login system.

Accordingly, aspects of the present disclosure are directed to other login methods and techniques that may complement (or be an alternative to) smartphone app-based login. If, for example, the driver chooses to leave Bluetooth disabled, the app may attempt to perform an automated login using a different communication protocol, such as Wi-Fi. Wi-Fi, however, may not work with sufficient accuracy if, for example, the driver was entering the vehicle in a location where there are many other enabled vehicles within Wi-Fi range. There may be several vehicles and devices visible on the same Wi-Fi network of a distribution warehouse, for example.

Even in situations for which the driver does enable Bluetooth communication, the smartphone app-based login may fail in other ways. The Bluetooth login signal may be broadcast to a neighboring vehicle, for example, such that the smartphone app inadvertently performs a login with a device that is in a different vehicle. Likewise, the Driveri device may inadvertently perform a login with a smartphone app belonging to a driver who is nearby, but not in the vehicle in which the Driveri device is installed.

According to certain aspects, to overcome challenges like the ones just described, a smartphone app-based login system may be configured to include an interactive driver prompt. Contemplated cases include Driveri devices being utilized to monitor trips that originate in locations with several other nearby Driveri devices; team driving scenarios; short-range and low-speed trip scenarios; and others.

Figure 5:
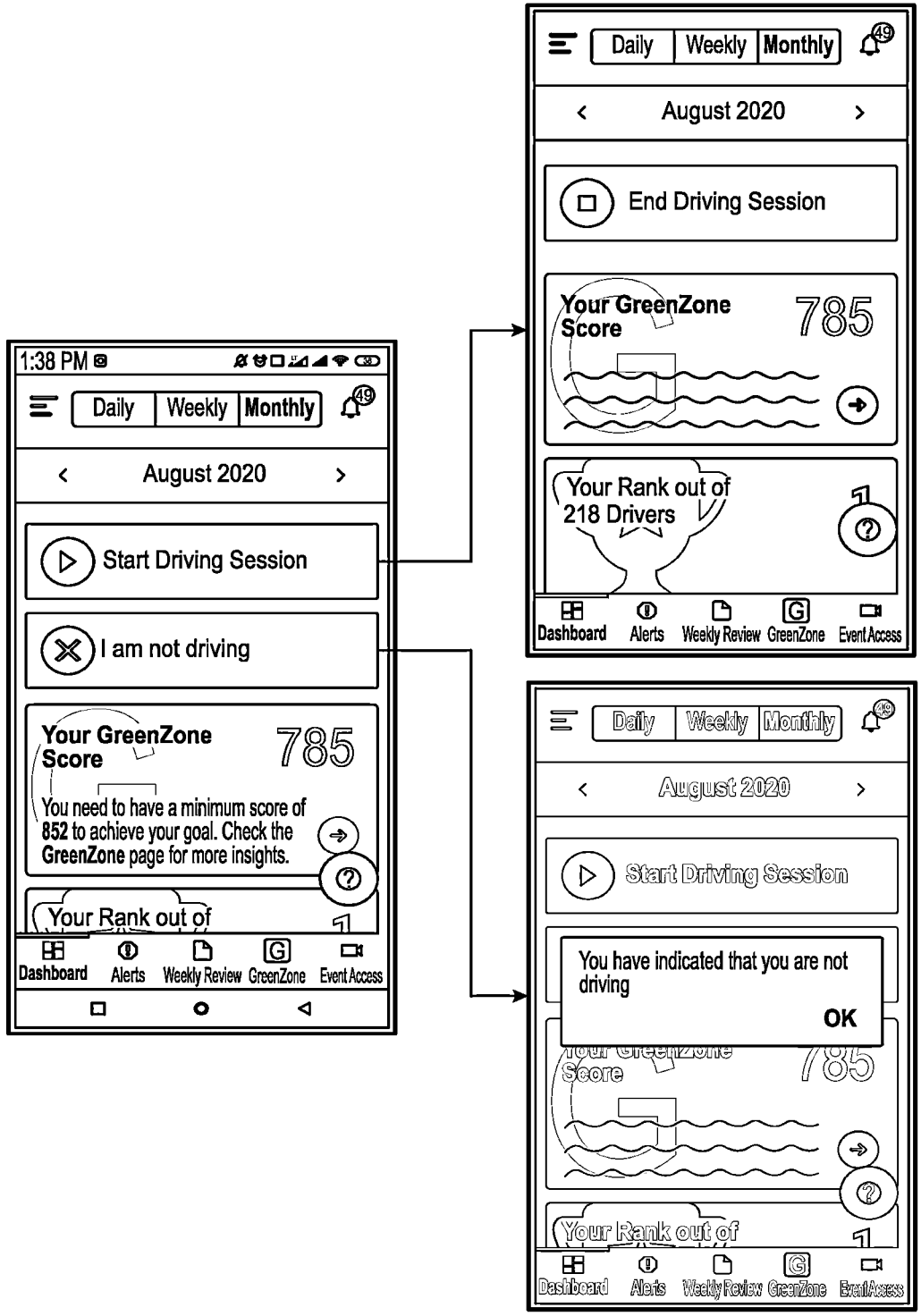
FIG. 5 illustrates an example of a smartphone app configured to enable a driver to manually indicate the start and end of a driving session, or that the driver is not driving in accordance with certain aspects of the present disclosure.

FIG. 5 illustrates an interactive display by a smartphone app that is configured in accordance with certain aspects of the present disclosure. An interactive display may make it easier to determine which of two drivers in a driving team (who are both present in a vehicle for the duration of a driving trip) is currently driving. As illustrated in FIG. 5, any of these drivers may indicate that he or she has begun to drive by clicking a "Start Driving Session" button or banner in the app. Likewise, the driver may click an "End Driving Session" button or banner when the trip is complete. Other drivers in the vehicle who are not driving can indicate the same by clicking an "I am not Driving" button. The app may then associate the correct driver with the trip for the duration based on when the driver clicked "Start Driving Session" and "End Driving Session."

An interactive app-based login system may be similar to an ELD-based driver login. For ELD, the driver may log in "actively" through a device that is installed in the vehicle. In one example, the driver may input a PIN code to a touchscreen at the start of the drive to log in. At the end of the drive, the driver may then actively log out of the driving session. In one example, the driver may press a log out button on the same touchscreen that was used to log in to indicate that he or she is logging out.

In a team-driving scenario, for which two drivers may be present in the vehicle while it is being driven by one of them, the issue of disambiguating between multiple drivers may not arise for an ELD system, at least not in the same way that it could for a passive smartphone app-based login system. In the ELD system, if the person who is driving logs in and the other member of the team does not, the drive time association may be considered accurate.

The ELD system, however, may be more susceptible to certain types of human errors. For example, if the first driver logs in, but then forgets to log out, the subsequent drive time may be inadvertently assigned to the first driver. If the first driver receives a prompt on an app asking if he or she is still driving or not, the first driver may be more likely to respond to it than he or she would to an ELD display that is facing the second driver.

Furthermore, according to certain aspects, the second driver's subsequent act of logging in may automatically log the first driver out. In addition, the second driver's subsequent act of logging out may trigger a message on an app carried by the first driver. For example, the app may include an interface in which the first driver can indicate when he or she should have logged out. In this way, any drive time that occurs between the time that the first driver should have logged out and the time that the first driver noticed the mistake may be assigned to a different driver. Similarly, a smartphone app may be configured so that only one driver may be logged in to a vehicle at a time.

An interactive smartphone app-based login system or an active ELD login system may be vulnerable to other types of errors, including intentional errors, such as spoofing. In the case of team-driving, a first driver may log in at the start of a driving session but with the intention that the second driver will drive. This practice may result in "ghost driving" in which the driver may be seated in the passenger seat while the vehicle is being driven on his or her behalf by an unknown driver. ELD login systems or app-based prompts may be poorly equipped to detect spoofing in a team-driving scenario, since a passenger may have access to the login interface.

While active login may help mitigate disambiguation errors, as just described, passive login approaches may be useful to overcome intentional errors, such as spoofing. Spoofing may be particularly problematic in a team driving scenario in which two drivers remain present, so that it may be possible that their physical beacons or smartphone apps remain present. Accordingly, certain aspects of the present disclosure are directed to Visual Login, which may be useful in deterring spoofing attacks, among other benefits.

Because Visual Login may be a passive login approach, it may not suffer the same risk of driver forgetfulness that may affect an ELD or interactive app approach. For example, there may be no adverse consequences associated with a driver forgetting to log in or log out. Still, according to certain aspects, elements of a passive and active login system may be combined. In one embodiment, a smartphone app can pop up the question only when it is ambiguous as to which driver is operating the vehicle. For example, when a Visual Login System (VLS) is uncertain, it may prompt a driver through a smartphone app to acknowledge that he or she is a driver or passenger.

Visual Login

According to certain aspects, a VLS may detect and/or authenticate a driver of a vehicle by processing an image that contains at least a portion of the driver's face or torso. According to certain aspects, a Visual Login System may include larger image crops (in comparison to a facial recognition system) and may therefore be more precise. Visual login may be passive, like a physical beacon or a passive app, but may have the advantage of being based on the physical appearance of the driver, something that the driver cannot forget to bring with him or her.

Enabling VLS may provide several benefits for a driving fleet. Drive time assignment speed and precision may be improved since specific driver assignment data may be available sooner. A VLS may also confirm existing driver data so a fleet can be confident that the correct driver is assigned to the respective drive time. Where there are gaps in drive time assignments, a VLS may result in fewer unknown driver alerts and unknown driver minutes analyzed.

As may be appreciated by those skilled in the art, there may be challenges with Visual Login Systems and methods, including challenges that may relate to precision by which the system may authenticate a driver. For machine learning systems configured to perform a Visual Login function, driver detection and/or authentication precision may directly relate to a size and quality of a training set. Accordingly, challenges relating to the use of Visual Login may stem from challenges associated with accumulating a sizable and quality training set.

According to certain aspects, a VLS may make use of other driver login data sources, such as a smartphone app or dedicated hardware beacon, to "train" the VLS. In some embodiments, a driver's face database can be automatically updated using a beacon ID (or smartphone app device attribute) to associate a collected image with a particular driver. Various techniques for combining beacons and face authentication are described in International Patent Application No. PCT/US17/48756, entitled "RECORDING VIDEO OF AN OPERATOR AND A SURROUNDING VISUAL FIELD," filed 25 Aug. 2017, which is incorporated herein by reference in its entirety.

In some embodiments, once training is done, the system may subsequently disregard other driver login sources. Still, in some embodiments, other login data sources may continue to expand or refine the scope within which a VLS operates effectively. A VLS, therefore, may include a continuous auto-learning process (and/or human-in-the-loop process) that improves over time as it is exposed to more images of drivers. When the system assigns the drive time to a driver, a subset of collected images may be automatically mapped by VLS to that driver. This may result in a VLS becoming increasingly adept at identifying the same driver in future.

Using a beacon ID to automatically associate a collected image with a face database for a particular driver could in some instances inadvertently decrease the precision of a machine learning system. For example, the newly collected image may not contain an image of the driver, due to spoofing, as described above. In this scenario, a machine learning system set to automatically include such images in a training set could become inadvertently misled so that it begins to detect as a correct match either the driver who logged in or the driver who actually drove the vehicle. In another example, collection of too many data samples similar to each other could crowd out rarer images, which may decrease the overall performance of the machine learning system. Several aspects of the present disclosures are directed to overcoming or mitigating these and other challenges.

A VLS, particularly one that employs machine learning techniques, may benefit from training images for each driver that are selected over multiple days and in multiple lighting conditions, etc. According to certain aspects, a VLS may more quickly accumulate images of a driver until a threshold number of images is reached, such as 200 images per driver. Likewise, after a threshold number of images are collected for a driver, subsequent additions to a training sample may be accomplished more slowly and may be more tuned for other considerations. For example, in later stages of image collection, image collection may be configured so that it is more likely that rare views of a driver are collected.

In some embodiments, a fleet may configure privacy settings for its driving monitoring system such that it tends to delete or deidentify video data after a specified period, such as three months. In this example, certain aspects may be employed to retain certain driver images for longer periods based on their utility for visual login, for training a visual login model, and for assessing the performance of a trained visual login model across different conditions or a diverse population of drivers. In this example, aspects of a VLS may contribute to a determination that a privacy policy exception has occurred or is more like to occur, based on the utility of retaining a short snippet of image data. In some instances, a single image may be preserved, or a portion of a single image may be preserved, even when video footage collected around the same time may be deleted for other privacy reasons. Likewise, certain image data may be selectively deidentified rather than deleted, for example, if it corresponds to a region of an embedding space (described below) for which there are not enough training and testing examples to ensure fair Visual Login performance.

According to certain aspects, images may be mapped to a particular driver based on a non-visual driver login source, including driver login sources described above, such as manual driver login by someone other than the driver, an ELD login by the driver, use of an app and/or beacon. In some embodiments, a non-visual login data source may be considered higher or lower priority based on various factors. For example, a vehicle-association based login source may be higher priority or lower priority in comparison to a visual login data source depending on whether the fleet tends to be one for which each driver only drives one vehicle, and each vehicle is only driven by one driver, or alternatively, whether individual vehicles tend to be driven by several different drivers.

In some embodiments, for each trip, one or more driver images may be captured and stored for use in subsequent training, and thereby enable VLS to enhance and improve its performance with respect to associating a driver to drive time. For example, an image may be selected for processing based on a determination that the vehicle is being driven at the time that the image was captured, based on knowledge derived from another source that a particular driver was driving the vehicle. In some embodiments, an image may be selected for processing based on a driver's pose, such as a pose in which the driver's gaze is directed toward the camera, the driver's gaze is directed to a straight-ahead direction associated with the vehicle's path of travel, and the like. In some embodiments, images may be selected based on a computed variation in driver poses, such that relatively uncommon poses are more likely to be selected. Conversely, more common poses may be less likely to be selected provided that enough such poses have already been selected. In some embodiments, a most common pose associated with a driver who is driving may be presumed to be a straight-ahead driving pose, since it may be presumed that a driver will spend more time looking ahead and in the direction that he or she is driving than any other position.

To amass a large and diverse training set of driver image data, there may be a burden associated with proper labelling of driver image data. Accordingly, certain aspects of the present disclosure are directed solutions to this nagging problem in the industry. Considering the various opportunities for failure with driver login systems, some of which are discussed above, it may be detrimental to automatically label driver image data with currently available driver login data. When driver login data is incorrect, automatically generated driver identifier labels that are derived from the driver login data will likewise be incorrect. One approach to handling these incorrect labels, which may be considered sources of noise in the context of a machine learning system, may involve substantial effort by human labelers. The burden of labelling driver images, therefore, may act as a constraint on the progress of such systems. Accordingly, certain aspects are directed to reducing human labeler effort. In some embodiments, a diverse group of driver images may be labelled with "one-click," as described below.

Certain aspects of the present disclosure are directed to User Interface (UI) improvements that may enable quick-start and adaptive Visual Login. In some embodiments, a user interface in accordance with certain aspects, may be referred to as a VLS Training Dashboard. The dashboard may include images of various drivers who have or have not yet been associated with a driver identifier, such as a Driver Name, a Driver ID, a nickname, or a code name.

In practice, the number of driver images to be labelled may be overwhelming. The following describes a technique that relies on a recognition of driver-invariant sessions to enable "one-click" labeling to substantially simplify the process of labeling and to reduce the burden on a labeler.

Driver-Invariant Sessions

In some embodiments, "one-click" driver assignment may be based on a determination of one or more driver-invariant sessions. A driver-invariant session may refer to a portion of a driving trip during which it is likely that only one driver was operating a vehicle. In some embodiments, a determination that a driving session is driver-invariant may be made with strict criteria, such that there is little to no chance that there has been a change of the person driving the vehicle. In some embodiments, in contrast, a determination that a driving session is driver-invariant may be made with relatively looser criteria, such that it is likely that the same driver has been driving for a period, even though there may be opportunities within that period during which two people in the vehicle may have been able to switch positions. For example, looser criteria may be applied for fleets in which drivers usually driver alone. Stricter criteria may be applied for fleets in which drivers usually travel with a partner.

Figure 6:
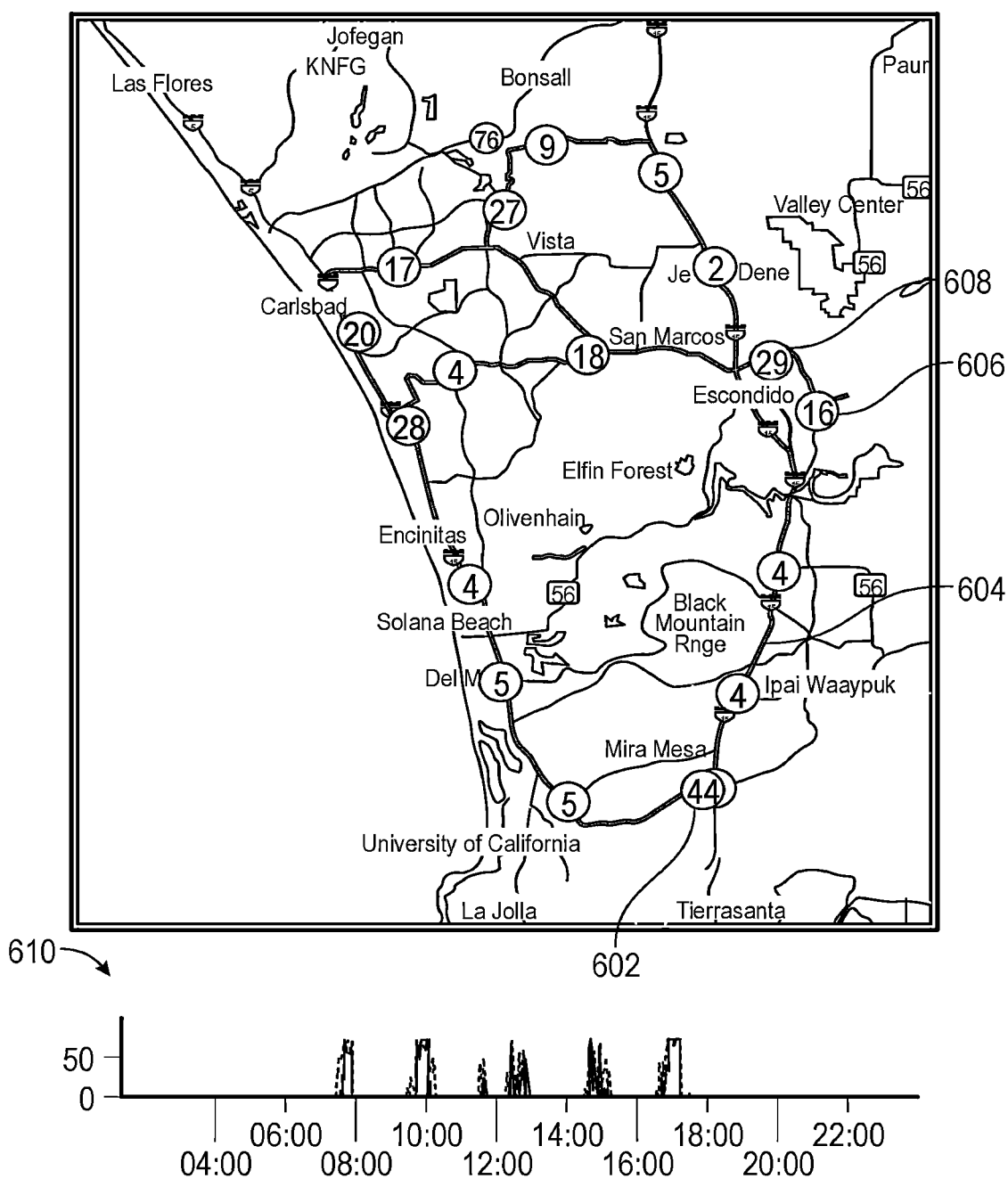
FIG. 6 illustrates a route driven by a vehicle and a speed profile for a 24-hour period in accordance with certain aspects of the present disclosure.

FIG. 6 illustrates a path taken by a vehicle during a typical workday for a vehicle in a fleet that makes multiple customer visits per day. The path begins and ends at a location 602 associated with a dispatch center of the fleet. The path 604 indicates that the vehicle first travelled North to a location near Escondido, CA, where it made two stops. The vehicle remained at the first stop 606 for 15 minutes, and at the second stop 608 for 29 minutes. The chart 610 at the bottom illustrates a maximum and minimum speed profile for the vehicle throughout the day, where each point in the chart reflects either a maximum speed or a minimum speed over a one-minute period.

Figure 7:
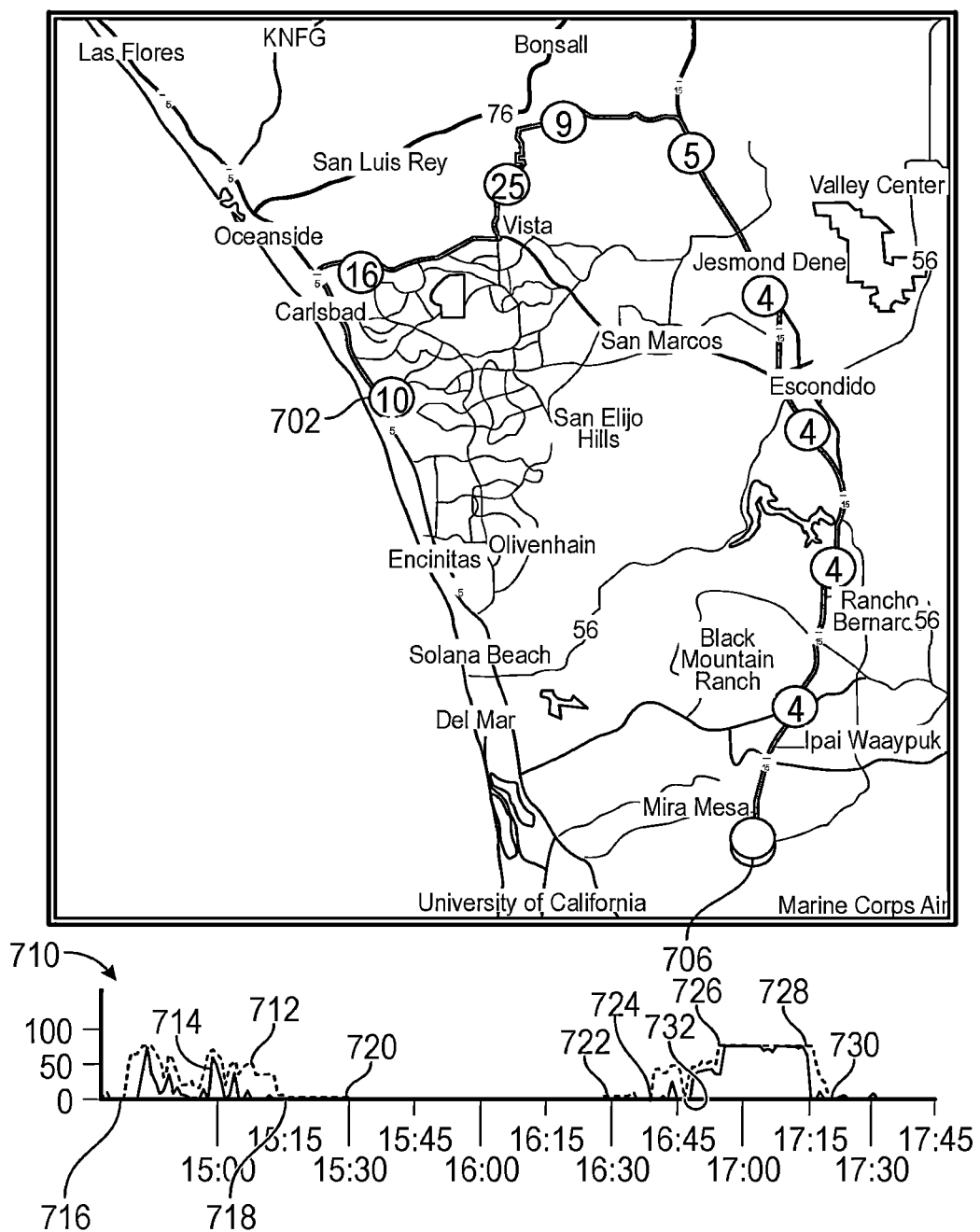
FIG. 7 illustrates a route driven by a vehicle and a speed profile for a 4-hour period within the 24-hour period illustrated in FIG. 6.

FIG. 7 illustrates a portion of the path that is illustrated in FIG. 6, specifically a portion ranging from approximately 2:30 pm (14:40) to 5:45 pm (17:45). The path begins at location 702 between Encinitas and Oceanside. The vehicle makes a first stop at a location 704 near Vista. The chart 710 at the bottom illustrates a maximum and minimum speed profile for this interval. The upper line 712 charts the maximum speed obtained in each one-minute interval while the vehicle was turned on. The lower line 714 charts the corresponding minimum speed obtained in the same one-minute intervals. As can be seen from the chart, the vehicle began the trip to the first stop at the time 716 and arrived at the first stop at the time 718. For a few minutes at both the start and end of this trip, the maximum speed per minute exceeded 30 mph, but the minimum speed was 0 mph, suggesting that the vehicle was in city traffic, such that the driver came to a complete stop at stop signs or traffic lights, or otherwise made at least one transient stop every minute.

The chart at the bottom of FIG. 7 further illustrates that the vehicle was powered down and/or the driver monitoring device was not reporting vehicle speeds from an interval spanning from the time 720 (approximately 3:30 pm (15:30)) to the time 722 (approximately 4:30 pm (16:30)). After time 722 the device began to report its speed again. A few minutes later the vehicle moved briefly and slowly, and then at time 724 began a second trip that would end at the location 706 associated with the company's dispatch center. The second trip contains an interval from 726 to 728 when the vehicle was travelling above 60 mph for approximately 20 minutes.

Various approaches to a speed-based determination of a Driver-Invariant Session (DIS) may be illustrated with reference to FIG. 7. A first approach, which may be referred to as a strict criteria approach, may assign the interval from 726 to 728 as the only DIS in this interval. According to the strict criteria, the minimum speed never dropped below 60 mph in the interval between 726 and 728, and therefore it would be highly unlikely that a driver would switch places with another person while driving the vehicle at such a high rate of speed, even if there were a second person in the passenger seat of the vehicle (assuming that there are no autonomous driving features available on the vehicle that would enable it to drive autonomously at least as long as it would take to switch places).

According to a loose criteria approach, there may be two DIS periods in the illustrated interval. The first DIS may span from time 716 to time 718 when the vehicle was actively engaged in the first trip from location 702 to location 704. The second DIS may span from time 724 to time 730 when the vehicle was actively engaged in the second trip from location 704 to location 706. In this example, the loose criteria approach may include times when the maximum speed in a given interval is above a threshold speed, even if the minimum speed is not. It may furthermore span short periods when the maximum speed is also below a minimum speed, such as at time 732, as might happen, for example at a long traffic light. The loose criteria approach may have the benefit of defining DIS periods that is more likely to span time intervals when the driver is engaged in city-driving. While the strict criteria approach might restrict DIS to times when the vehicle is being driven in free-flowing highway traffic, the loose criteria approach may also include other times. According to certain embodiments, a loose criteria approach may be preferable, as it may result in defining DIS periods that include times when the driver is more likely to look to more eccentric gaze positions that may be more substantially rarer during free-flowing highway driving.

According to certain aspects, therefore, a determination of a DIS may comprise a definition of "driver-invariant" that may incorrectly (but infrequently) include driving sessions in which the vehicle made a very brief stop, but the driver of the vehicle was changed nonetheless. As explained below, driver images may be linked together in an embedding space based on the likelihood that the driver images correspond to different views of the same person. In certain embodiments, to correct for possible DIS errors, the links between images may retain information that may be used to confirm or reject a link at a later processing stage. Examples include the minimum vehicle speed between the times that two images were collected, or the duration of any stop between the times that two images were collected. A clustering technique may then incorporate this additional information so that, for example, links associated with stop durations above a set threshold are discarded.

Intermediate methods for determining a DIS are also contemplated. In addition to the strict and loose criteria described, a determination of a timespan of a DIS may be based on both the maximum and minimum speeds remaining above a minimum threshold speed, wherein the speed threshold of the maximum speed may be higher than the speed threshold of the minimum speed. In addition, a maximum period of idle time may be incorporated into the determination of a span of a Driver Invariant Session.

Figure 8:
FIG. 8 illustrates an interior view of a vehicle, the path of which vehicle is illustrated in FIG. 6, at three different times during the 24-hour period illustrated in FIG. 6.

FIG. 8 illustrates an interior view of a vehicle, the path of which was illustrated in FIG. 6 and FIG. 7. The three panels of FIG. 8 were captured by an internal facing camera attached to a device mounted on the windshield of the vehicle. In the top image, the driver 802 can be seen looking downward and the passenger 804 can be seen looking at a smartphone device. A bounding box 806 is drawn around the driver. The second image, captured about five seconds after the first image, shows the driver 808 looking towards the passenger and smiling. In the third image, captured hours later, the driver is looking straight ahead in the direction of travel of the vehicle. A bounding box 810 surrounding the driver contains many regions that are nearly saturated by the bright light of a late afternoon sun.

Figure 9:
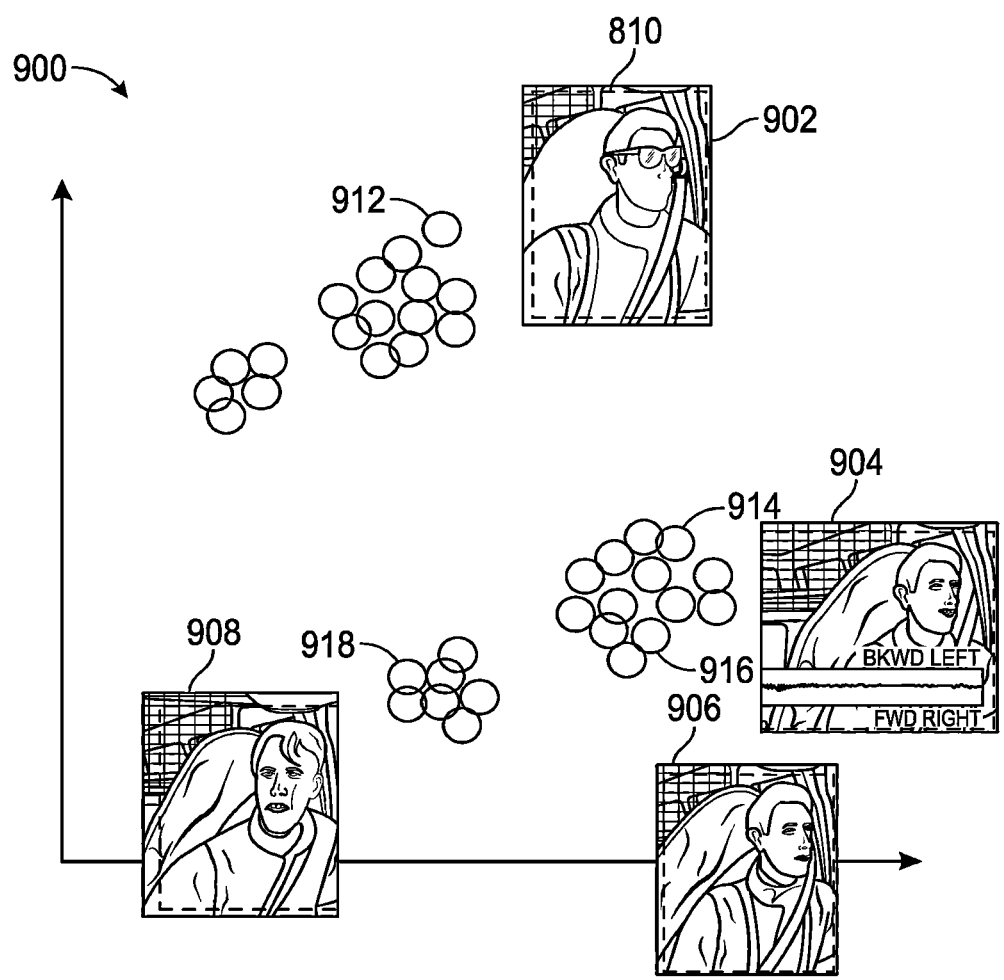
FIG. 9 illustrates an embedding space and example embedding locations associated with driver images in accordance with certain aspects of the present disclosure.

FIG. 9 illustrates an embodiment of certain aspects of the present disclosure in which a driver image may be processed so that it is projected into an embedding space. An embedding space may be a 128-dimension intermediate layer of a neural network, for example, such as a neural network that is trained to perform multiple visual detection and recognition tasks. A driver image may be a portion 902 of an interior-facing camera view, which may be delimited by a bounding box 810 around the driver as well as a buffer of additional pixels. The driver image 902 may be processed, for example, by a driver monitoring device attached to the camera that captured the image (or additionally/alternatively at a remote server), with an embedding generator, such that the driver image is projected into an embedding space 900. The embedding space 900 only visualizes two dimensions, but many more dimensions may be used in practice. A typical embedding space, for example, may have a dimension equal to 64, 128, 256, and the like. A location to which an image is projected within an embedding space may be referred to as an "image vector" since the location corresponds to a vector of values, each value indicating a position in one of the N-dimensions of the embedding space.

As illustrated in FIG. 9, driver image 902 may be projected to embedding location 912 in the middle upper region of the illustrated embedding space 900. A second driver image 904 may be projected to embedding location 914. A third driver image 906 may be projected to embedding location 916. A fourth driver image 908 may be projected to an embedding location 918. The driver images illustrated in FIG. 9 may be described as either looking straight ahead (which may appear to be looking to the left from a camera mounted near the center of the windshield), as in driver images 902, 904, and 906. Driver image 908, in contrast, may be described as looking in the direction of the camera, or near to the direction of the camera. Driver image 908 was captured at a time when the driver was maneuvering in city traffic such that he was viewing cross-traffic in an intersection at the time. In addition, whereas driver images 908, 906, and 904 were captured under even lighting conditions, driver image 902 was captured at a time when direct sun was hitting most of the driver's face, a portion of his torso, as well as the seat back.

Figure 10:
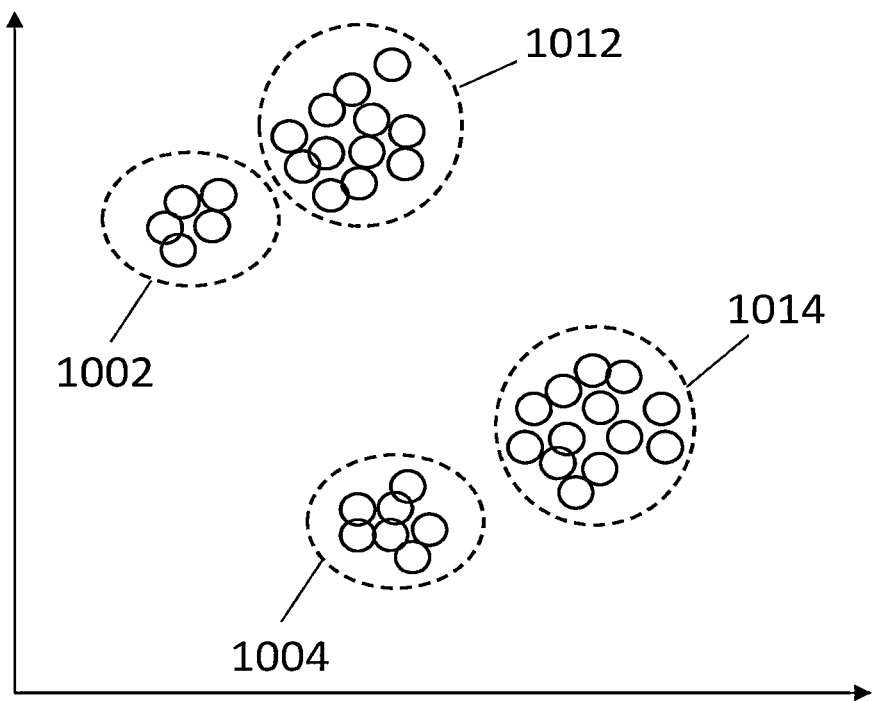
FIG. 10 illustrates an embedding space and four identified clusters in accordance with certain aspects of the present disclosure.

As illustrated in FIG. 10, the embedding locations of a set of images may be clustered. Clustering techniques may include configuration of one or more parameters that impact how tight the thresholds for inclusion within a cluster may be. FIG. 10 illustrates tight clustering thresholds that result in four embedding location clusters. Cluster 1012 includes driver image 902. Cluster 1014 includes driver images 904 and 906. Cluster 1004 includes driver image 908. An additional cluster 1002 did not have an associated driver image in FIG. 9. If more permissive clustering criteria were used, clusters 1012 and 1002 might be merged into a single cluster because of the application of a clustering technique; similarly, clusters 1014 and 1004 might be merged into a second single cluster under looser clustering criteria. In the embodiment illustrated in FIG. 10, the clustering thresholds are set so that images within a cluster tend to appear similar to each other, such that they all correspond to an image of the same driver, and furthermore, while the driver is looking in a particular direction.

Referring to both FIG. 10 and FIG. 9, cluster 1014 may be considered to include images of the driver when he is looking straight ahead and not wearing sunglasses or any other occluding accessories. Cluster 1012 may be considered to include images of the driver when he is looking straight ahead but is wearing sunglasses. The embedding locations of these images may be separated from the embedding locations of cluster 1012 due to the information content normally present in a driver's eyes and in the portions of the driver's face around the eyes that may be obstructed by sunglasses. Cluster 1004 may be considered to include images of the driver when he is looking in the direction of the camera, and again not wearing sunglasses. Given these relationships, one could infer that Cluster 1002 might include images of the driver looking in the direction of the camera but wearing sunglasses, as will be explained further below.

Figure 11:
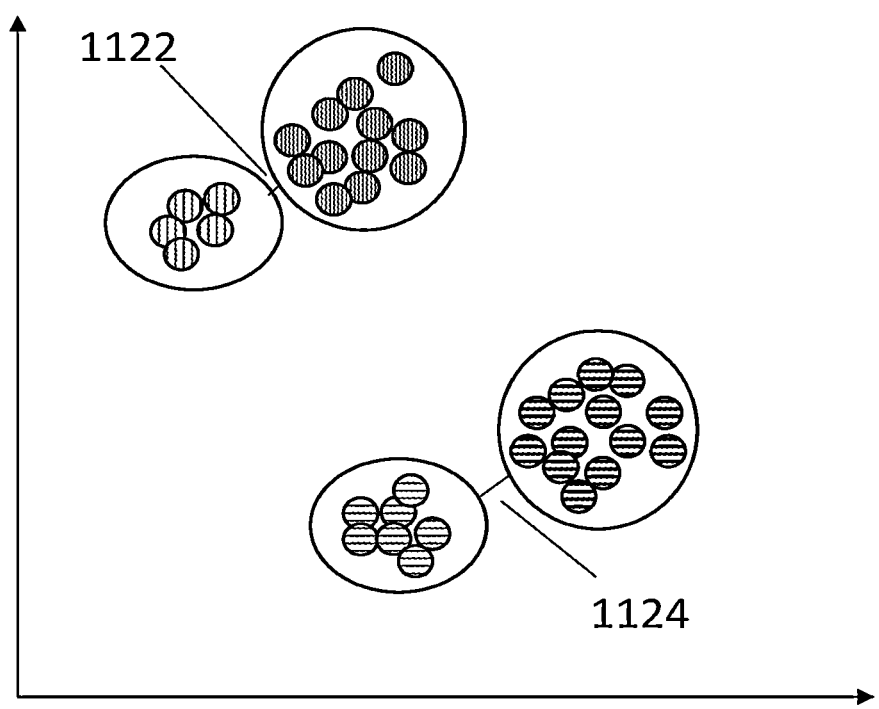
FIG. 11 illustrates an embedding space and two groups of linked clusters in accordance with certain aspects of the present disclosure.

A technique for building up a diverse set of clusters, in which each cluster provides a different view of the same driver, is illustrated in FIG. 11. Noting that driver images 908, 904, and 906 were recorded during a single DIS, the two clusters that contain these three images may be linked 1124 based on the DIS. That is, because the images were collected during a driver-invariant session, a link between those clusters may reflect a reasonable inference that images in both clusters are likely to contain images of the same driver.

Similarly, driver image 902 may have been recorded during a DIS, on a different day, that also comprises a driver image capture projected into cluster 1002. Based on this second DIS, the two clusters may be linked 1122. FIG. 11, therefore, may reflect the state of clustering and cluster linking after two days or recorded driving. The clusters associated with the first day may be linked by link 1124. The clusters associated with the second day may be linked by link 1122. As illustrated in FIG. 9, the two sets of linked clusters may all refer to the same driver, but at this stage there may be two separate groups of clusters in a database of linked driver image data owing to the driver wearing sunglasses on the second day, but not on the first day. Because of this difference, the embedding locations of the images that were captured may not have overlapped across the two days, and therefore, and this stage, no links would be automatically formed between clusters corresponding to images of the driver on different days.

Figure 12A:
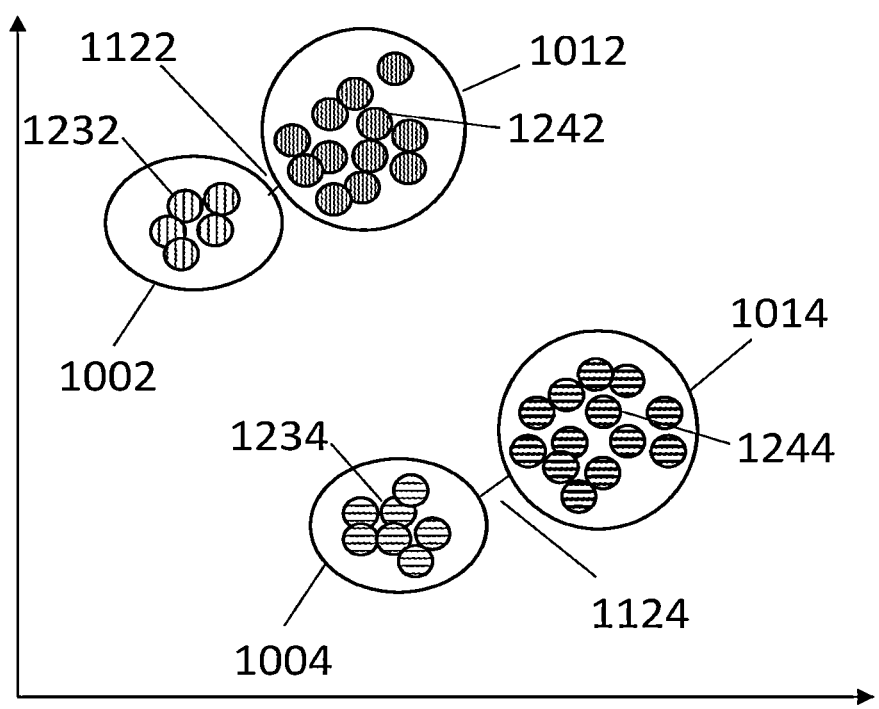
FIG. 12A illustrates an embedding space and two groups of linked clusters in accordance with certain aspects of the present disclosure.

FIG. 12A illustrates a method, in accordance with certain aspects of the present disclosure, for selecting a representative image from each group of linked clusters in the embedding space. In some embodiments, a representative image may be selected as the image embedding location that is closest to the center of one of the linked clusters. For example, two clusters are illustrated that are linked together by link 1124. For each of these two linked clusters, a processor may select an embedding location associated with an image that is closest to the center of its respective cluster. Embedding location 1234 and embedding location 1244 may be the image embedding locations that are closest to the center of cluster 1004 and cluster 1014, respectively. Likewise, embedding location 1232 and embedding location 1242 may be the image locations that are closest to cluster 1002 and cluster 1012, respectively that are linked by link 1122.

In some embodiments, a processor will have determined which cluster of a group of linked clusters will be considered a "root" cluster. The root cluster may be a cluster that is larger (i.e., contains more members) than other clusters in the linked group. Alternatively, the root cluster may be a cluster that is most closely associated with a particular pose, such as looking towards the camera, which may be easier to recognize by a person familiar with the driver. In some embodiments, the cluster that is associated with a gaze in the direction of the camera may be smaller than the cluster associated with a gaze in the direction of the road. For such embodiments, it may be advantageous to select the representative cluster from the smaller cluster because a representative image from this group will be more easily recognized.

In some embodiments, the cluster that is associated with a gaze in the direction of the camera may be the largest cluster of a group of linked clusters associated with a driver due to a sampling bias. For example, a Driver Monitoring system may be configured to select an image of the driver periodically, such as at a rate of once every ten minutes. The system may be further configured to identify images from a set of candidate images from the most recent period that are consistent with looking in the direction of the camera. In this way, even though the driver might spend most of the time in each ten-minute interval looking straight ahead at the road, the sampling mechanism might tend to yield images in which the driver happens to be looking in the direction of the camera. Such a sampling bias may be achieved by collecting multiple images in the ten-minute period, computing a gaze direction for each of the collected images, and then selecting the image having a gaze direction closest to the direction of the camera at the end of the ten-minute period.

Images may be sampled in a similar way to select images that correspond to the second, third, or fourth most common gaze direction, which may correspond to the driver looking at the left side view mirror, right side view mirror, and a location where the driver can directly observe the vehicle's blind spot. Such images may be useful in building up a more complete representation of the driver's face, which may improve overall accuracy of the Visual Login system. Alternatively, or in addition, such examples may be used to train a model (such as a Base Model explained below) on an alternative visual processing task, such as determining whether the driver is looking at a side view mirror or in the direction of his blind spot.

In an embodiment in which the largest cluster of a linked group of clusters is selected as the root cluster, a representative image of the driver will be selected from the largest cluster for a driver assignment interface. Returning to FIG. 12A, cluster 1014 may be considered the root cluster for the group consisting of clusters 1004 and 1014. As explained, however, the representative image need not be selected from the largest cluster corresponding to a single driver. For example, cluster 1004 may be selected as the root cluster, as might happen if, as in this example, the cluster associated with the driver looking towards the camera is a relatively smaller cluster.

Figure 12B:
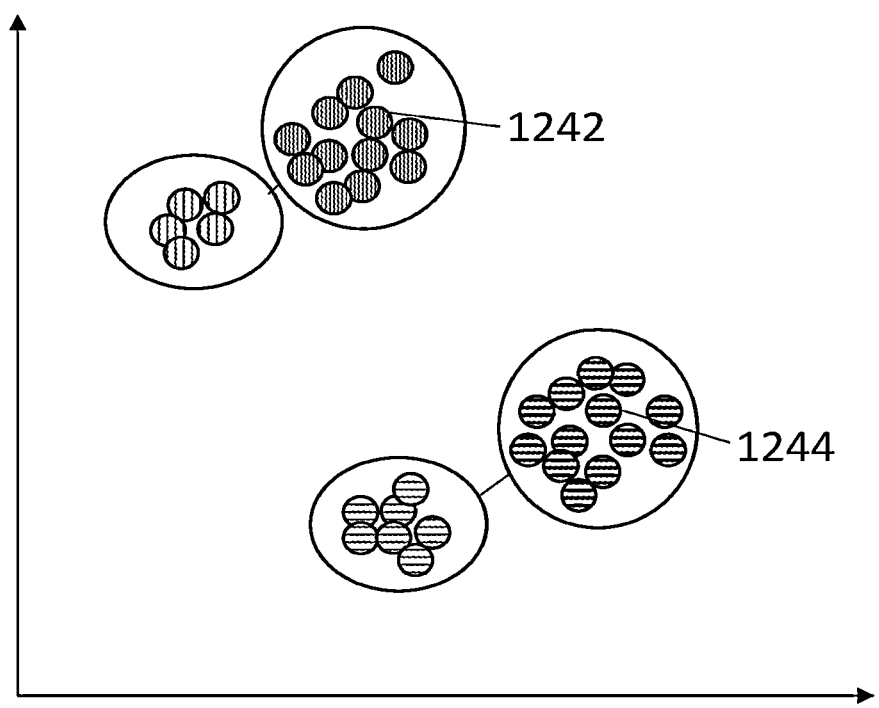
FIG. 12B illustrates an embedding space and two groups of linked clusters in accordance with certain aspects of the present disclosure.

In some embodiments, the image associated with the embedding location nearest the center of the root cluster may be selected as a "representative" image of a group of linked clusters. As illustrated in FIG. 12B, the image associated with embedding location 1244 may be selected as the representative image of the clusters belonging to the group that includes clusters 1004 and 1014. Likewise, the image associated with embedding location 1242 may be selected as the representative image of the clusters belonging to the group that includes clusters 1002 and 1012.

FIG. 12B illustrates an example of enabling a "one-click" driver assignment. A processor may be configured to display the representative images to a user together with a list of driver IDs corresponding to drivers in the same fleet. In this case, because there are two groups of linked clusters, the user may be presented with two images, which may be the images associated with embedding locations 1242 and 1244. The user may then click on one of the images (the "one-click"), for example, the image associated with embedding location 1244, and may then select a Driver Name or other driver ID corresponding to the driver that the user believes is depicted in the representative image. In one example, clicking on image 1244 may cause the display of a drop-down menu containing the names of drivers (or a list of driver identifiers) who were previously registered with the fleet. In an alternative embodiment, clicking on image 1244 may cause the display of a text box. The user may then enter the name of the driver, (or some other driver identifier) into the text box. To save time and to avoid creating multiple driver IDs for a single person, it may be desirable to configure the driver assignment display so that the user may select a name from a presented list of candidate drivers who are known to be associated with the same fleet as are the drivers depicted in the representative images. Upon associating the one representative image with the Driver name (or Driver ID, etc.), all the other images in the same cluster 1014, as well as all the images of any linked clusters, such as cluster 1004, may be associated with the same Driver Name (or Driver ID, etc.). In this way, a diverse set of images of a single driver (images from multiple clusters) may be labeled with one or two clicks of a computer mouse or similar computer interaction, thus avoiding a laborious process of labeling each image of the driver.

Because there are two groups of clusters associated with one driver in FIG. 12B, this example may be considered an illustration of a "two-click" Driver assignment, which may occur when, as here, the different clusters belonging to the same driver have not yet been fully linked. In this example, the two representative images would be an image of the driver without sunglasses and an image of the driver with sunglasses, respectively. Because these two groups of clusters have not been linked together, the system may select and display more than one representative image for a given driver (one for each group of linked clusters). Through an interactive user interface, the user may then click on both representative images that belong to the same driver (two clicks) and then associate these representative images to each other, or simultaneously to a Driver Name or Driver ID as described above, which may entail a third click, dragging the selected images to the chosen Driver Name or ID, and the like.

Figure 13:
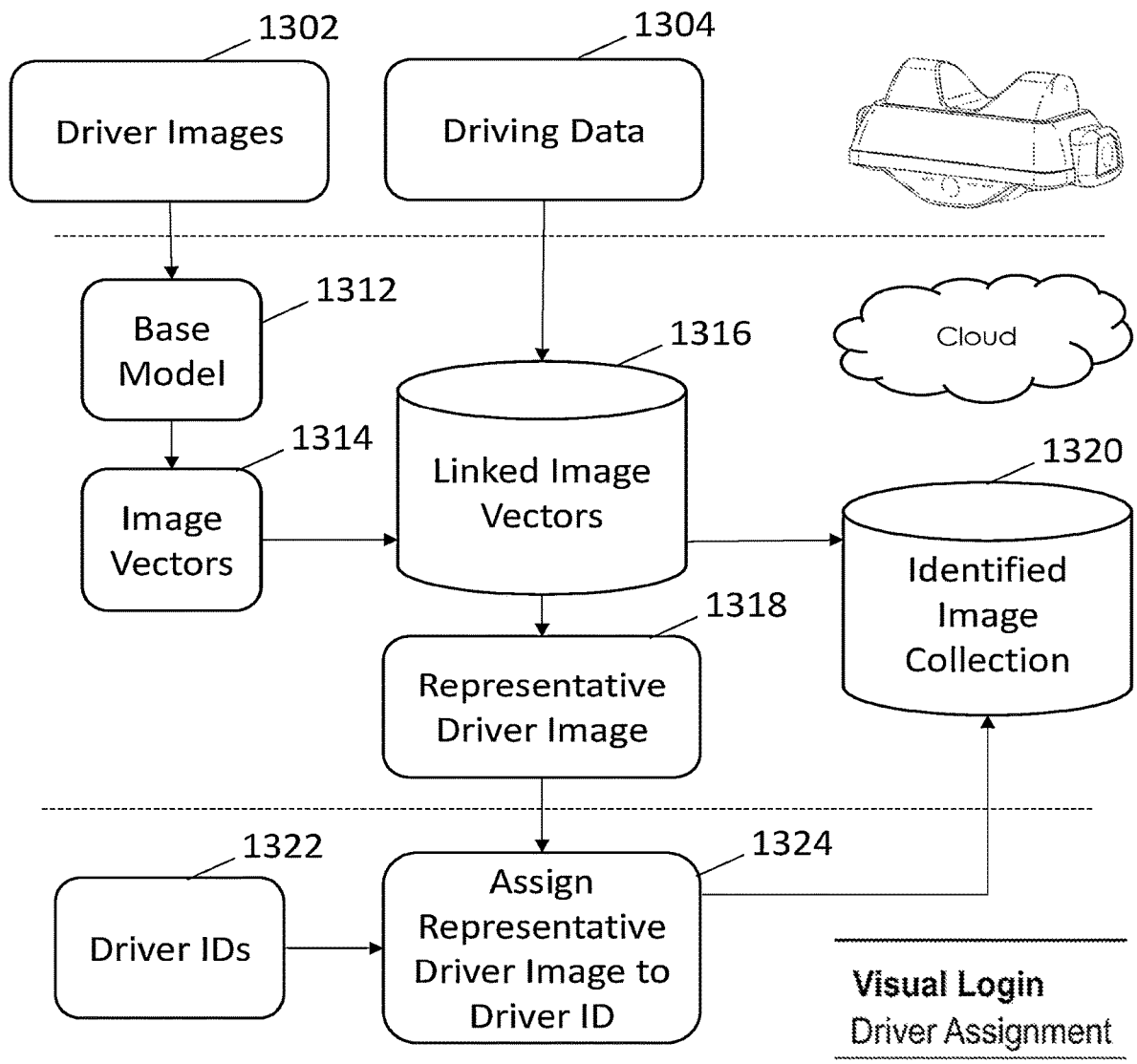
FIG. 13 illustrates driver assignment based on representative images and a list of registered driver identifiers in accordance with certain aspects of the present disclosure.

FIG. 13 illustrates assignment of a driver ID to an image collection based on a display of a representative driver image and a list of candidate driver IDs. In some embodiments, a Representative Driver Image 1318 may be assigned to a registered driver using, for example, an interface in which one or more representative driver images are displayed together with a drop down list of Driver IDs 1332. The driver assignment interface may be accessed by a user after the user has added or registered one or more drivers. Using such a driver assignment interface, a user may Assign a Representative Driver Image to a Driver ID 1324. For example, a fleet manager may select a driver-identifier from a drop-down menu of registered drivers after selecting one of the representative images. After the user makes the assignment 1324, several Driver Images, including the representative image and all images that are linked thereto (as described above) may be added to a database as an Identified Image Collection. If the driver ID was already associated with an Identified Image Collection, the two collections may be merge. Otherwise, a new Identified Image Collection 1320 may be created.

Figure 14:
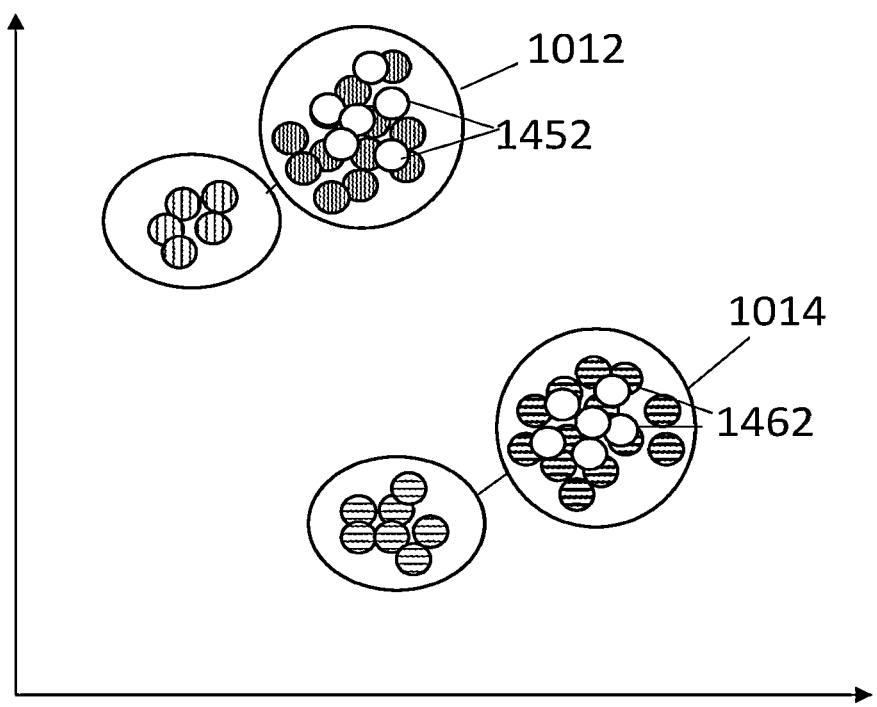
FIG. 14 illustrates an embedding space and two groups of linked clusters in accordance with certain aspects of the present disclosure.

FIG. 14 illustrates a technique, in accordance with certain aspects of the present disclosure, that may further refine the grouping of linked clusters so that the user is presented with only one representative image for each driver. Embedding locations may have been recorded from a third DIS. In this third DIS, the driver may have spent some of the drive time wearing sunglasses, and some of the drive time with sunglasses removed. The images that were selected from the driver for the purposes of VLS training may have spanned both states, resulting in several associated embedding locations 1452 that overlap with cluster 1012, and a separate number of embedding locations 1462 from the same Driver Invariant Session that overlap with cluster 1014.

Figure 15:
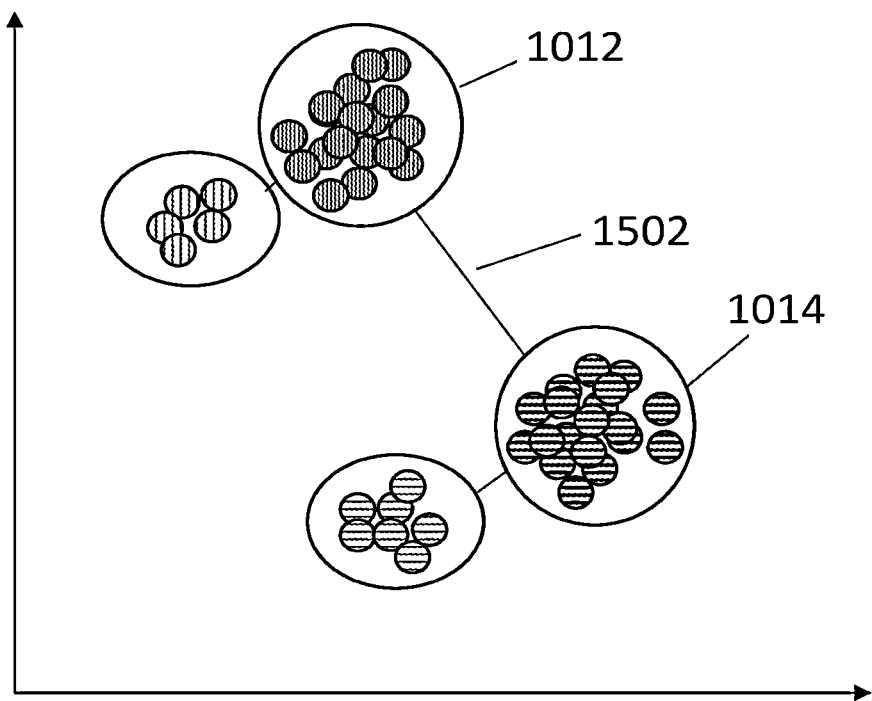
FIG. 15 illustrates an embedding space and a group of linked clusters in accordance with certain aspects of the present disclosure.

As illustrated in FIG. 15, based on the overlap of embedding locations of newly collected images, the third DIS may be determined to span the collection of images in clusters 1012 and 1014. On this basis, a new link 1502 may be formed. This link 1502 may then cause the two previously isolated groups of clusters to be linked together into a single cluster. As illustrated in FIG. 9, this larger group of linked clusters may include different views of the same driver. As before, according to certain aspects, one of the clusters in the combined group may be designated the root cluster, and a representative image may be selected from that root cluster. For example, the representative image may be selected based on the driver's pose as well as the lighting condition, so that the user may be presented with an image that is not saturated by direct sunlight or otherwise obscured. In this way, the "one-click" association between a driver image and a driver identifier can be enabled. These techniques for linking clusters may also be based on other sources of driver login data, such as manual login data, etc.

Figure 16:
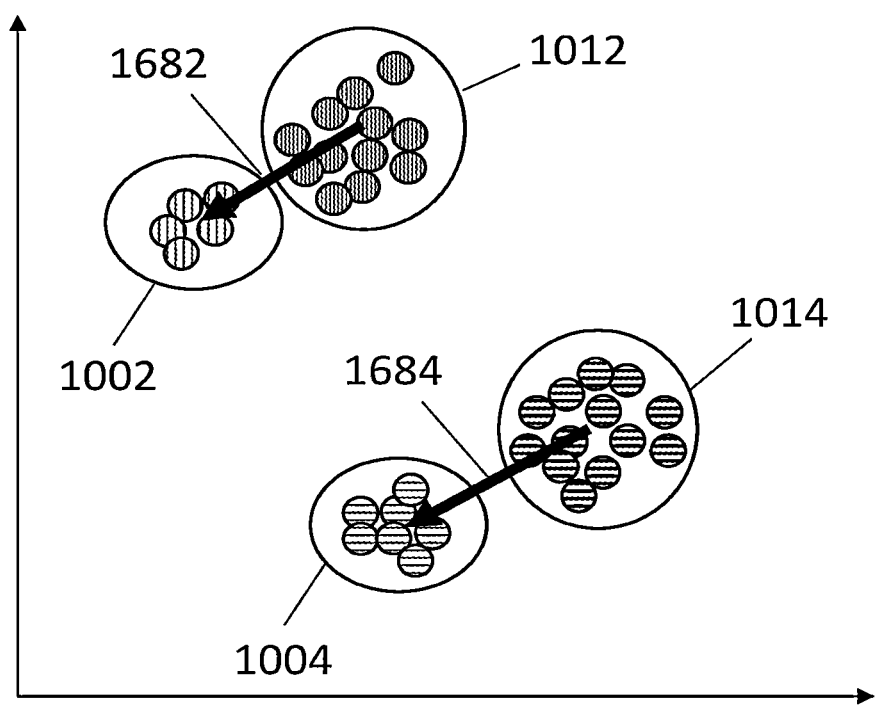
FIG. 16 illustrates an embedding space and two groups of linked clusters in accordance with certain aspects of the present disclosure.

According to certain further aspects, relationships between certain clusters of a group of DIS-linked clusters may be determined. As illustrated in FIG. 16, embedding space vector 1684 may indicate a distance and direction between cluster 1014 and cluster 1004. As can be seen with reference to FIG. 9, driver images associated with cluster 1014 may be different from driver images associated with cluster 1004 in that the latter includes images in which the driver is facing the direction of the camera, while the former includes images in which the driver is facing straight ahead towards the direction of travel of the vehicle. Accordingly, the vector 1684 may be considered to transform an image embedding location from a straight-ahead gaze position to a camera-facing gaze position. A second vector 1682 may then be calculated between clusters 1012 and 1002. Because vector 1682 is similar to vector 1684 in direction and magnitude, vector 1682 may be predicted to transform driver images in cluster 1012 (straight-ahead, wearing sunglasses), to the gaze associated with cluster 1002 (camera-facing, wearing sunglasses). Accordingly, if a representative image is selected from cluster 1004 because it is expected to contain a more easily labelled image of a driver, a representative image may also be selected from cluster 1002 rather than 1012 since it may be inferred that images in cluster 1002 are relatively easier to label.

In some embodiments, vectors between clusters, such as vectors 1682 and 1684 may enable extrapolation to new clusters that have not yet been observed. For example, images may be collected for a second driver and then projected into the embedding space. The second driver may never wear sunglasses, at least not at times when driver images were collected for this driver. According to certain aspects, a location in the embedding space in which images of the second driver would likely project if the second driver were to wear sunglasses could be estimated. In some embodiments, clusters that form in these locations may be considered more likely to form links with previously assigned clusters. In this way, according to certain embodiments, a Visual Login System could learn to authenticate a driver when the driver is wearing sunglasses, even though the VLS has not previously observed that driver wearing sunglasses. The same technique could be applied to other accessories or modifications to appearance, such as baseball caps, facial coverings, facial hair (e.g., beard), and others.

In some embodiments, ELD, Beacon, or smartphone app techniques may be combined with VLS techniques just described. For example, ELD data may be considered a source of "seeding" of a VLS, so that it may operate faster ("quick start"). For example, links may be established based on ELD data instead of or in addition to DIS data. Given the possibility of long sequences of incorrectly linked clusters based on ELD data, other techniques may be employed to mitigate the effects of erroneous ELD data. For example, links between clusters that are based on ELD data may be probabilistic in nature. Many repeated links between clusters over multiple days may be strengthened, while links that are not refreshed between clusters on different days may be weakened. In this way, the errors of an ELD-based assignment may be forgotten, but the correct assignments may be remembered by the linked cluster system disclosed herein. Manual, beacon, and/or smartphone app links may be similarly treated. In a similar manner, non-visual login data may be used to linked groups of clusters that have previously been linked incompletely using the DIS linking method described above.

Processing Image Vectors with a Fleet-Specific Neural Network Model

Certain aspects of the present disclosure may be used to improve the precision with which a driving monitoring system assigns driving data to a correct driver. In certain commercial settings, a business may operate a fleet of vehicles and may employ several drivers to drive the vehicles. While some vehicles may only be driven regularly by one driver, other vehicles may be driven by different drivers on different days. Thus, for effective monitoring of driver safety across the fleet, there is a need to accurately determine which driver was driving which vehicle on each day. Based on this determination, the driving data that is observed by the driving monitoring system may be appropriately assigned to the correct driver.

Figure 17A:
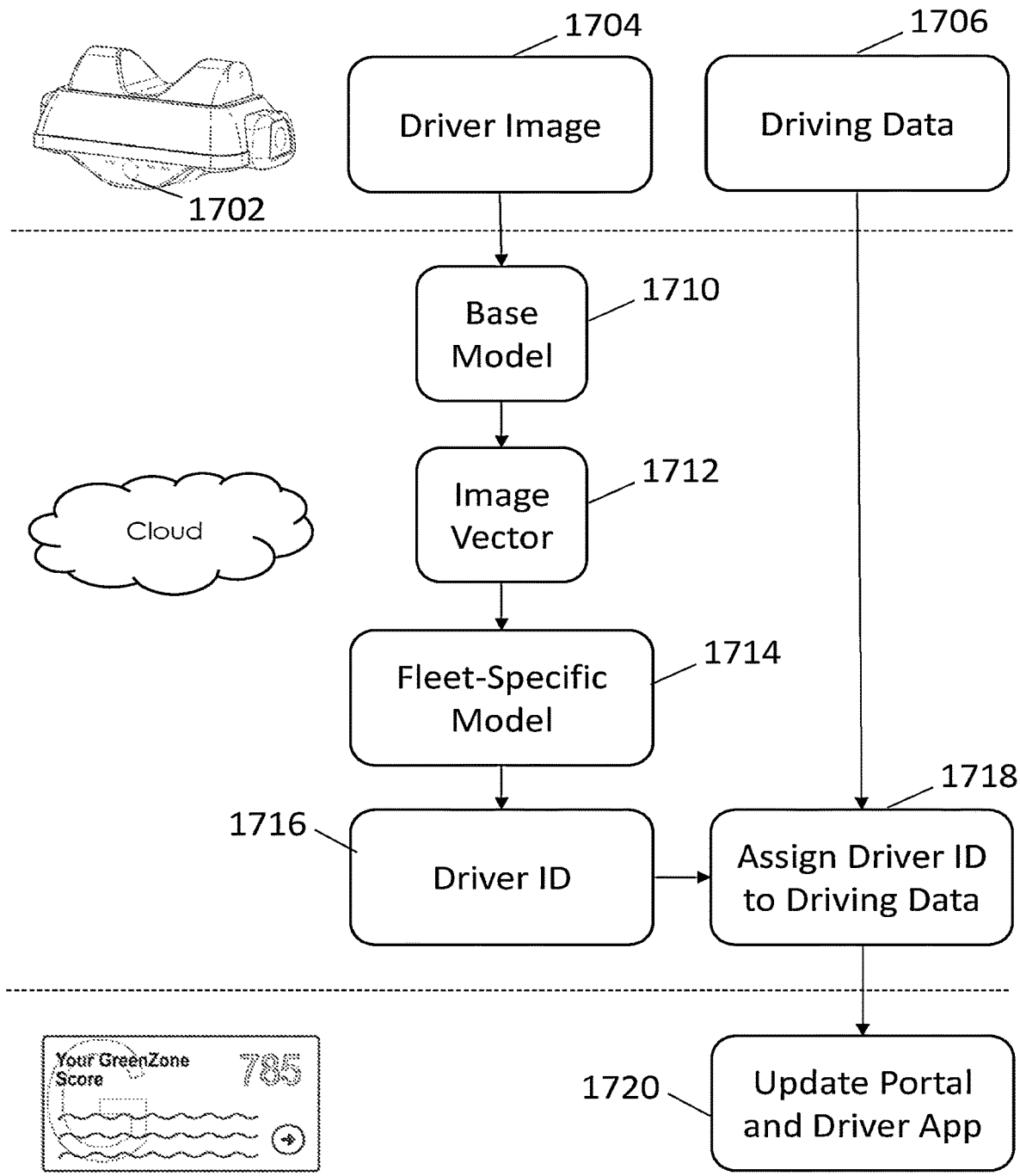
FIG. 17A illustrates an example data flow for a visual login system in accordance with certain aspects of the present disclosure.

FIG. 17A illustrates the use of a fleet-specific neural network model to correctly determine which driver from among a group of candidate drivers in the fleet is most likely to be the driver or a vehicle on a given day, based on a driver image captured by a device in the vehicle on that day. There are three sections in FIG. 17A. The top section illustrates that an inward-facing camera 1702 in a vehicle-mounted device may capture a driver image 1704 and driving data 1706. As explained above, the driver image may be selected based on the driver's pose and direction of gaze, such that the device may be configured to preferentially select a driver image at a time that the driver is looking in the direction of the camera 1702. As explained below with respect to model training, the device may alternatively be configured to preferentially select driver images so that the machine learning system may accumulate a diverse set of training images for each driver. The vehicle-mounted device also collects Driving Data 1706, such as geolocation data, speed, and detections of certain positive (risk-mitigating), negative (correlated with risk), or neutral driving events.

In an embodiment such as one corresponding to FIG. 17A, the Driver Image 1704 may be transmitted via a cellular data connection to a cloud server. One or more processors on the cloud may then process the Driver Image 1704 to produce a Driver ID 1716 that is most likely to correspond to the driver who is pictured in the Driver Image 1704. These processing steps may be considered in three parts. First, the Driver Image 1704 may be processed by a Base Model 1710. Second, the Base Model 1710 may output and Image Vector 1712. The Image Vector 1712 may correspond to an embedding location, such as embedding location 918 illustrated in FIG. 9. Third, the Image Vector 1712 may be processed by a Fleet-Specific Model 1714, which (as will be explained below) may have been trained to output the probability that each driver within a certain fleet is represented by an image vector that was computed based on a base model, such as the Image Vector 1712 that was computed based on Base Model 1710. The Driver ID 1716 may then be determined by selecting the driver identifier associated with the output of the Fleet-Specific Model 1714 having the highest probability. If the probability of the most likely driver is above a threshold and/or the probability of a driver that is indicated by another source of driver login information (such as ELD data, as described above) is above a second threshold, then the system may automatically assign Driving Data 1706 to Driver ID 1716. This association may then be used to update a customer Portal and/or a Driver App 1720. For example, based on the association of driving data to a driver id, a GreenZone score (which is a summary driving safety score) may be updated for a particular driver, and this update may be transmitted to an app on that driver's smartphone.

Figure 17B:
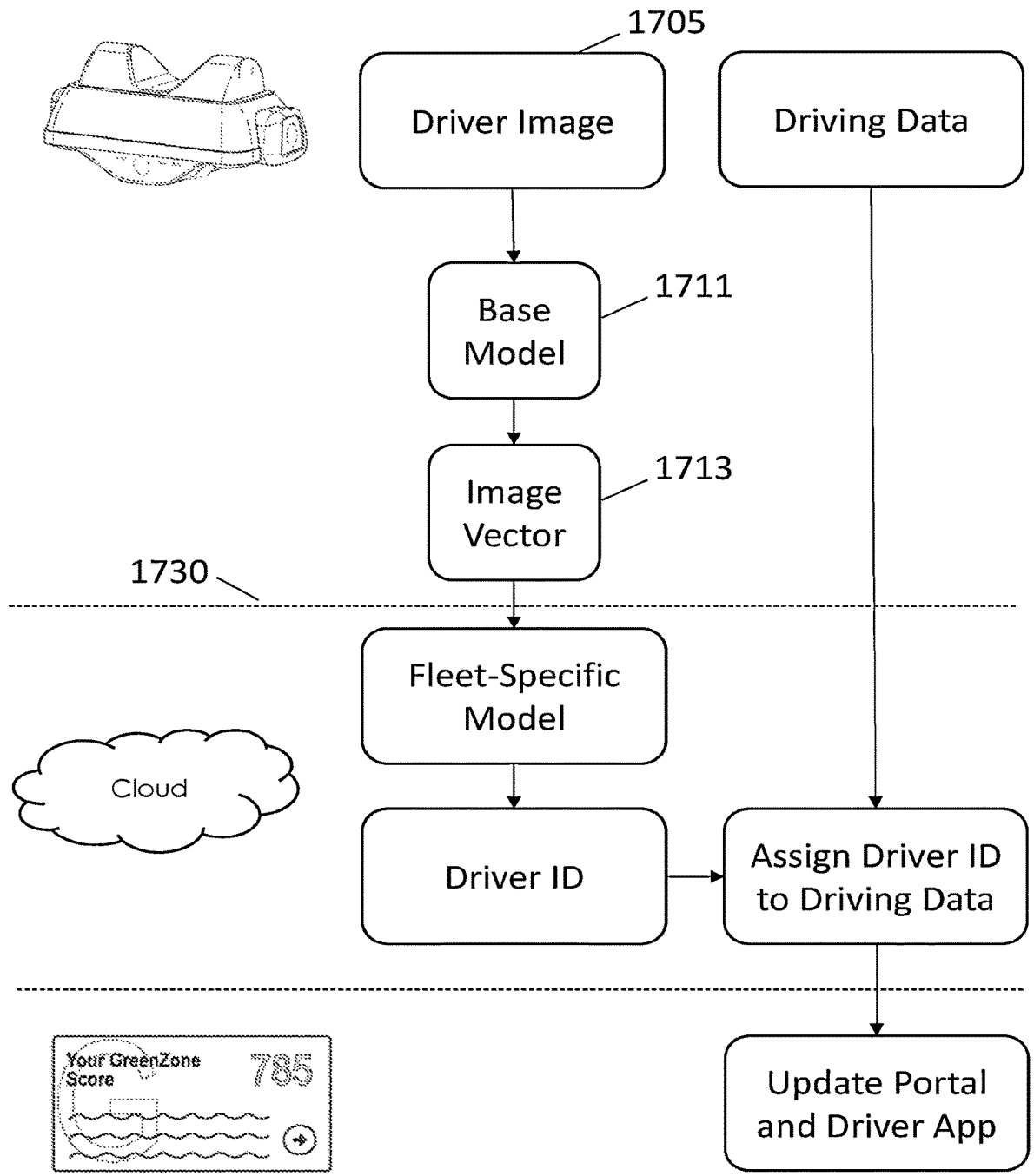
FIG. 17B illustrates an example data flow for a visual login system in accordance with certain aspects of the present disclosure.

FIG. 17B illustrates an alternative embodiment of certain aspects of the present disclosure. For embodiments corresponding to FIG. 17B, the processing of the Driver Image 1705 by the Base Model 1711 resulting in an Image Vector 1713 is performed on a processor that is mounted within the vehicle. Rather than transmitting the Driver Image 1705 to the cloud, the dividing line 1730 is drawn after the Image Vector 1713 has been generated. The Image Vector 1713 is then transmitted to the cloud, where it can be processed by a Fleet-Specific Model. The remaining steps are then equivalent to those described with respect to FIG. 17A. In comparison to FIG. 17A, the data flow illustrated in FIG. 17B may be considered more protective of a driver's privacy. Because the Driver Image 1705 is not transmitted off the device, there may be fewer images of the Driver Available on a cloud server, and thus the Driver Image 1705 is less susceptible to unauthorized access.

In some embodiments, the Base Model and Fleet-Specific Model processing may be performed on the vehicle-mounted device, so that only a Driver ID, or a set of probabilities associated with each candidate driver, are transmitted to the cloud. This approach may be more bandwidth efficient since less data is transmitted. In comparison to the data flow illustrated in FIG. 17B, an embodiment for which the Driver IDs are computed on the device may be considered more privacy enhancing if the Image Vector 1713 data is itself considered a privacy risk. However, the data flow illustrated in FIG. 17B may be considered more privacy enhancing if the Image Vector 1713 is associated with a well-protected Base Model 1711, such that the Image Vector 1713 is effectively a random set of numbers in the hands of an entity that intercepts the data. Furthermore, without access to the Fleet-Specific Model, the Image Vector data on its own may not be useful to an interceptor in determining the identity of the driver.

With respect to FIG. 17A (and similarly for FIG. 17B), the Base Model 1710 and Fleet-Specific Model 1714 may be considered a single neural network. In this view, the Image Vector 1712 would be understood as a set of activations of an intermediate layer of the combined neural network model in response to the Driver Image 1704. In some embodiments, for which processing of both the Base Model and Fleet-Specific Model are performed on the same processing device, the neural networks may be configured so that Base Model 1710 and Fleet-Specific Model 1714 are combined into one neural network. This may result in faster processing times in comparison to a design for which the Image Vector is stored into memory and then accessed again prior to processing by the Fleet-Specific Model.

While it may be advantageous to combine the processing steps associated with a Base Model 1710 and a Fleet-Specific Model 1714, there are other accuracy and privacy-oriented considerations that may make it advantageous to decouple the training of these two neural networks, as explained below in the subsection entitled "Model Training".

Monitoring and Characterization of Facial Covering Compliance

Facial coverings became mandatory in some countries and states during the COVID-19 pandemic. Monitoring compliance for facial coverings has become an important problem for certain business. For example, in some grocery stores, employees and customers are required to wear facial coverings. For some delivery services, delivery personnel are required to wear facial coverings. As another example, taxicab or ride-share services have adopted policies in which drivers are required to wear facial coverings, and passengers likewise may be required to wear a facial covering.

Certain aspects of the present disclosure address techniques for measuring and improving facial covering compliance. Facial covering compliance may refer to a person's compliance with a safety policy that includes a requirement or a suggestion that the person wear a facial covering.

While this disclosure primarily describes facial covering compliance as an example, it will be appreciated that teachings disclosed herein may be applied to other forms of health and safety compliance, such as determining that persons are wearing gloves, jackets, face shields, and the like. Furthermore, techniques provided herein that may enable the rapid development of a facial covering compliance system may be applied to other forms of health and safety compliance.

In one embodiment, a facial covering compliance determination may include detecting a person or a face bounding box and classifying an image crop associated with the bounding box for facial covering status. This technique may be employed when a neural network has been trained on multiple examples of the different classes of wearing or not wearing a facial covering, which may be an alternative task on which a base model may be trained, as described above.

In another embodiment, a facial covering compliance determination may include detecting a person or a face bounding box, and further detecting facial keypoints. Facial keypoints may include keypoints associated with the nose, the mouth, the general area of the nose and mouth, and the like. The presence or absence of such keypoints may then be used to classify the image crop for facial covering status.

In some embodiments, classification of facial covering status may include one or more of the following categories: Mouth and nose covered by a facial covering; Mouth and nose visible; Mouth and nose visible with a facial covering on neck; Mouth covered but nose is not covered; Visibility is obstructed and status cannot be determined.

Aspects of the present disclosure may be adapted to operate in the context of delivery personnel. In such embodiments, a camera mounted to the vehicle being driven by the delivery personnel may provide an image upon which a facial covering compliance determination may be based.

An embodiment of certain aspects of the present disclosure for which facial covering compliance monitoring is configured for delivery personnel may include a determination that the person has exited the vehicle. Upon determining that the person has exited the vehicle, a time window surrounding the time that the person exited the vehicle may be considered for a facial covering compliance determination. Facial covering compliance determinations that are performed at a time that is proximate to the driver's exiting the vehicle may be useful in determining whether the driver has complied with a healthy safety policy directed to wearing a facial covering while the driver is outside of the vehicle making a delivery.

Determining that the person has exited the vehicle may be accomplished using one or more techniques, as well as combinations of techniques. For example, the determination that the driver has exited the vehicle may be based a vehicle speed (obtained by GPS or CAN or Visual Odometry, and the like). Alternatively, or in addition, the determination that the driver has exited the vehicle may be based on a computer vision and/or machine learning algorithm that is detecting the driver and tracking the location of the driver inside and/or outside of the vehicle. For example, the driver may be detected moving in a rear compartment of the vehicle where packages are stored, which indicates that the driver is preparing to make a delivery. Alternatively, or in addition, the determination that the driver has exited the vehicle may be based on a classification and change detection algorithm to determine the time segments where a person is wearing a facial covering (compliant) or not wearing a facial covering (non-compliant).

In some embodiments, the mapping of a facial covering classification to facial covering compliance may depend on one or more policies of the business. In one example, facial covering status may be considered compliant if the facial covering covers both nose and mouth. In another example, facial covering status may be considered compliant if the facial covering covers the mouth. In another example, facial covering status may be considered compliant if a facial covering is seen on driver. A facial covering detected on the driver's neck while the driver is still in the vehicle, for example, may indicate an intention that the driver will wear the facial covering after leaving the vehicle and before going to the location of delivery.

Multiple modes of processing are contemplated. In one embodiment, a facial covering compliance determination may be based on a camera pointed in-cab, and may not further consider other cameras that may be available to the processor. In another embodiment, processing may be based on multiple combinations of cameras (in-cab, outward, side cameras). Furthermore, such embodiments may include fusing the output from multiple cameras, and/or tracking the person and compliance status across cameras, meaning as the person becomes detectable in different fields of view associated with different cameras that may be mounted to the vehicle.

In some embodiments, a facial covering compliance determination may incorporate processing of camera images from cameras that are not mounted to a vehicle. For example, a smartphone camera system may take a picture of the delivery and simultaneously, or at a proximate time, capture an image of the person. Likewise, a smart doorbell system may be accessed to the extent that it could verify that the driver was wearing a facial covering at the time of delivery.

As noted above, while these embodiments are described in relation to a driver of a vehicle, it should be appreciated that these techniques may be applied to multiple personnel, including one or more passengers or support personnel.

FIG. 17 illustrates several examples in which a driver of a delivery vehicle is shown wearing a facial covering.

Application to Taxicab and Ride-Sharing Drivers and Passengers

An embodiment of certain aspects of the present disclosure for which facial covering compliance monitoring is configured for taxicab and ride-sharing drivers and passengers may include periodic determinations of facial covering compliance when the vehicle is moving. Still, even for such contexts, the entry and exit of passengers may be particularly useful times to perform a facial covering compliance determination.

In some embodiments, time windows of interest may depend on one or more policies of the business. Time window of interest may include: when the vehicle is moving; when a passenger enters the vehicle; and/or when the driver is on the way of to pick up the passenger.

Determinations of the time window of interest may be based on an integration of vehicle status via an API from the taxicab/ride-sharing information technology infrastructure. Alternatively, or in addition, the determination of the starting and ending of a time window of interest may be based on a Computer Vision/Machine Learning algorithm that detects and tracks multiple people within the vehicle.

Mouth Visible Ratio

Certain aspects of the present disclosure contemplate the determination of a number of images in which a mouth is visible to a number of images in which other parts of a driver's face are visible and detectable, such as the eyes, ears, eyebrows, forehead, and the like. This ratio may be referred to as a "mouth visible ratio."

Figure 18A:
FIG. 18A illustrates various examples of facial covering behavior.
Figure 18B:
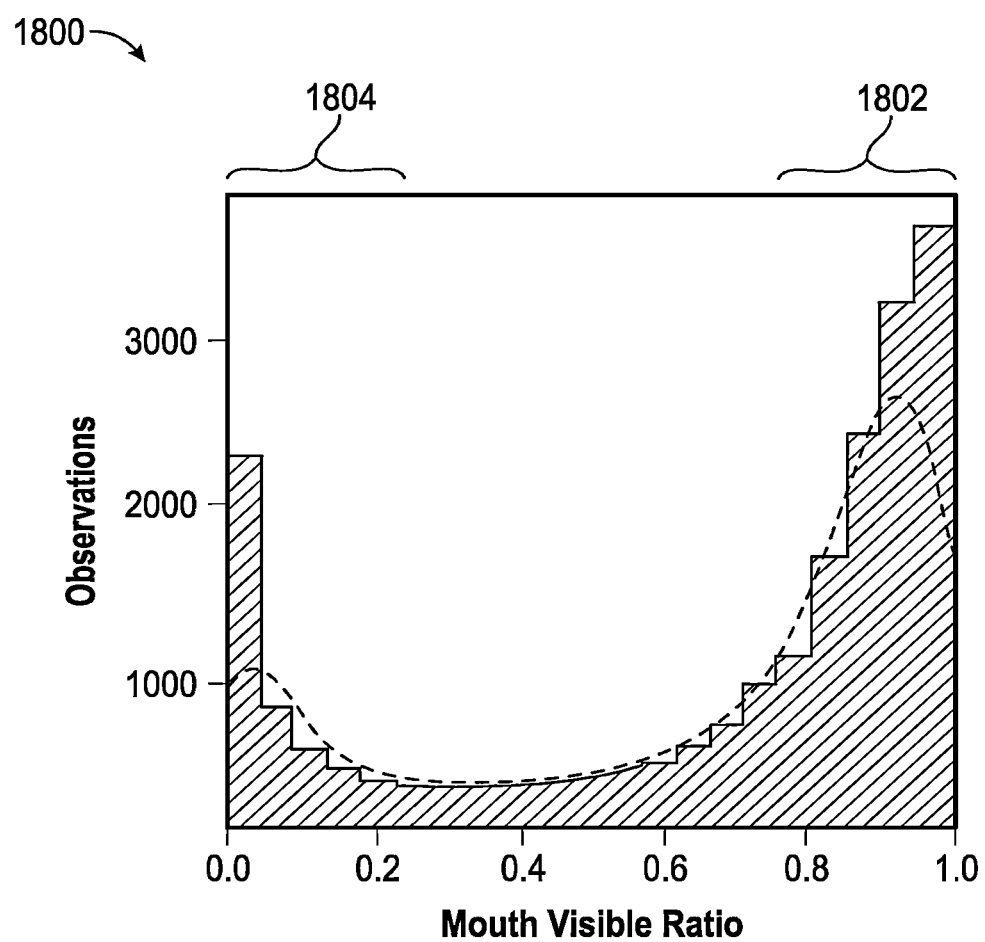
FIG. 18B illustrates a distribution of facial covering metric values.

FIG. 18B illustrates a histogram 1800 of observed "mouth visible ratio" values across a diverse number of drivers in a time period in late April 2020 associated with a widespread COVID-19 related lockdown of many parts of the United States, which is a time when policies regarding the usage of facial coverings were rapidly evolving. As can be seen, the distribution of "mouth visible ratio" values has large clusters at each end. Upon further inspection, this "mouth visible ratio" served as a suitable technique for performing a facial covering compliance determination. That is, drivers associated with a high "mouth visible ratio," such as those falling on the right side 1802 of the histogram 1800 of observed "mouth visible ratio" values, tended to be the drivers who were not wearing a facial covering. Likewise, drives with a low "mouth visible ratio," such as those falling on the left side 1804 of the histogram 1800 of observed "mouth visible ratio" values, tended to be drivers who were wearing a facial covering.

In accordance with certain aspects of the present disclosure, the "mouth visible ratio" metric may be employed in the context of a learning system. Initially, extreme values of the metric could be used to identify positive and negative examples with high confidence, which could then be used to train an CV/ML classifier. In addition, examples having "mouth visible ratio" values in the middle could be mined as hard examples. These middle-value examples, for example, would be good candidates for human labelling with close inspection, whereas extreme valued examples could either be added to a labelled database without inspection or could be inspected in a batch mode wherein a human labeler might consider a large sample of thumbnail images at once, where the labelling task is reduced to quickly identifying outliers that should be excluded from the training or moved to the opposite category. In this way, based on the confidence of the true label of each image, the labeler's task may be transformed so that the labeler is only asked to find and click on images that are different from the surrounding images. This may involve substantially less interaction in comparison to a system that requires the labeler to assign each image to an appropriate class.

Figure 18C:
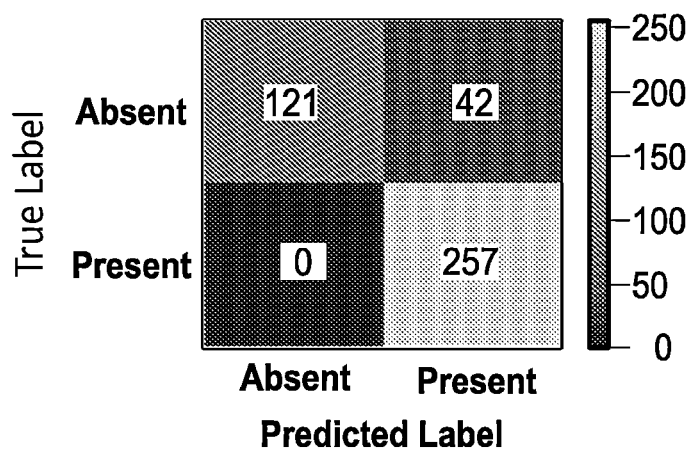
FIG. 18C illustrates a table of facial covering threshold values and a confusion matrix based on a sample of real-world data.

Analysis is provided from approximately 10,000 processed alerts from a trial that took place during April 2020, during the COVID-19 pandemic. As shown in FIG. 18C, slightly less than half (49.5%) of the sample of processed alerts are associated with a "mouth visible ratio" of 0.8 or greater, which are those drivers contributing to the observation counts that fall on the right side 1802 of the histogram 1800 depicted in FIG. 18B.

As further shown in a confusion matrix in FIG. 18C, which is based on a subset of alert videos having a "mouth visible ratio" in either of the extreme values on the left side 1804 and right side 1802 of the histogram 1800. In this sample, when the true label is "PRESENT" the "mouth visible ratio" based classifier is never incorrect. That is, when a driver is wearing a facial covering, the "mouth visible ratio" is low, even if there are some false detections of the driver's mouth. There is some confusion in the "ABSENT" case, however, which indicates that when the driver is not wearing a facial covering, the mouth visible ratio may still be depressed for other reasons.

From this state of a classifier's development, one or more of the following techniques may be employed. In some embodiments, it may be appropriate to iterate on a feature definition, as the "confused" classifications may indicate corner cases that should be handled with separate heuristics. In some embodiments, a classifier may be trained and tuned with increasing numbers of examples.

In accordance with certain aspects, broader pilot testing may be employed to actively pursue hard examples, which may then be employed in a "Hard Example Mining" classification framework.

Handling False Alarms and False Positives

A customer policy may be stated as, "Driver must wear a facial covering when making a delivery." A method or system to determine compliance with such a policy may be enabled by: Internal Camera Visibility; Vision-based object detection of facial covering; and/or the establishment of alert and/or rule to measure compliance.

An alert may be considered a component of a technique to verify precision. When the system triggers an alert, a video of the compliance or non-compliance event may be reviewed by a human labeler or developer. Based on this review, the precision of the policy determination system may be computed. Determinations made afterwards, or before (that is, made on the basis of applying the policy determination system to previously recorded data) may then be considered to have a similar level of precision even if the associated videos are not reviewed.

An alert rule may undergo subsequent refinement. For example, upon building and piloting a facial covering compliance alert feature, an alert rule may serve to restrict analysis to only those instances where driver has made a stop and is about to leave the vehicle.

Certain false alarm and false positive events are contemplated. These events may be used to further refine an alert rule. In one example, a putative false alarm may arise in which the system determines that the facial covering is absent, but in fact the facial covering is around the neck and not covering the face. Depending on the policy of the fleet manager, the facial covering compliance system might classify this event as an example of a facial covering that is NOT being worn. If so, this event would actually be a true positive.

Figure 19:
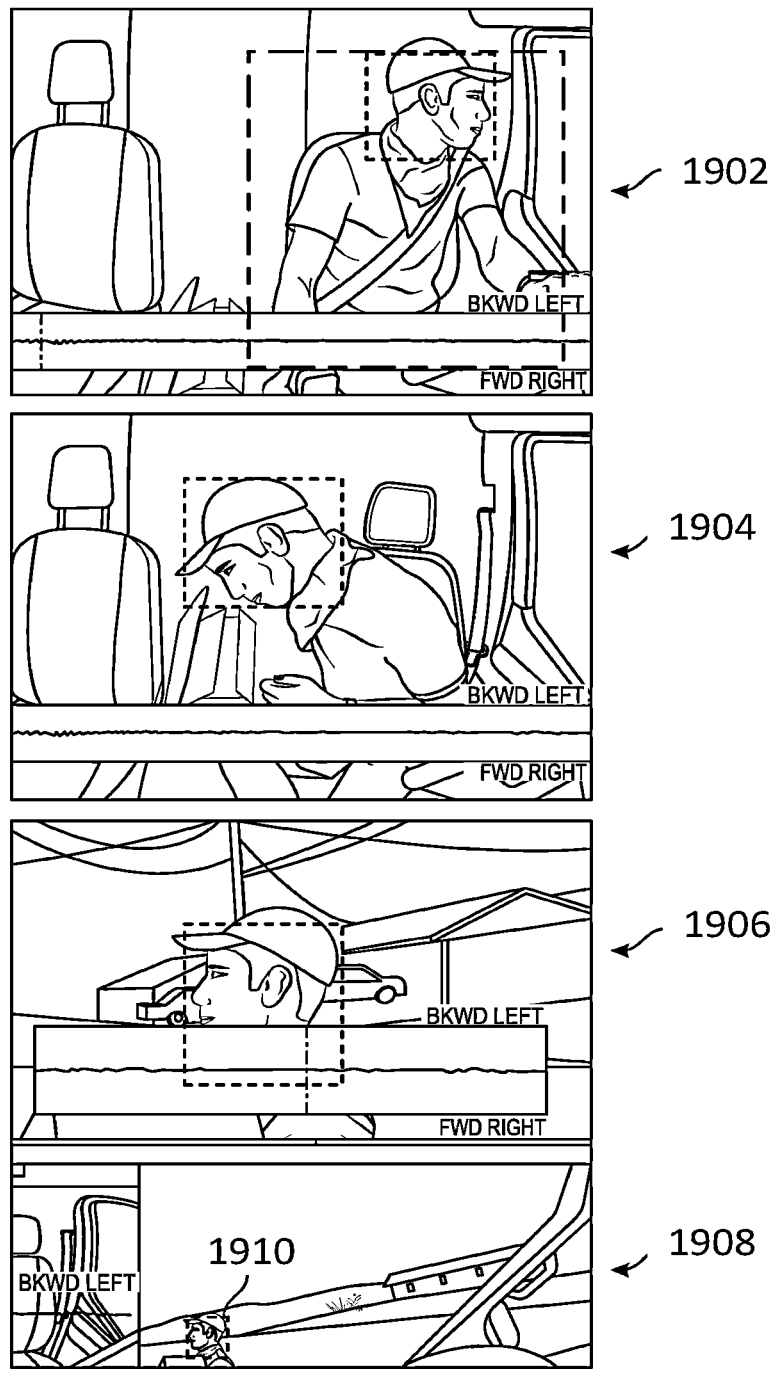
FIG. 19 illustrates a driver detected not wearing a facial covering while outside of the vehicle and while making a delivery.

Another edge case involves a confirmation that the driver completed the delivery with the facial covering applied. There are instances where the driver exits the vehicle without a facial covering either worn or applied—and makes an adjustment after leaving the vehicle and prior to making a delivery. FIG. 19 illustrates an example of a driver who was not wearing a facial covering while driving, as captured in a first image 1902. At a later time, the same driver is preparing to exit the vehicle without a facial covering worn or applied, as captured in a second image 1904. The same driver later exits the vehicle without a facial covering either worn or applied, as captured in a third image 1906. Unlike the first image 1902 and the second image 1904, the third image is captured by an outward-facing camera. An image 1908 captured from a right-facing camera at the same time that the third image 1906 was captured also shows the same driver. The location of the driver within the right-facing camera image is depicted with a bounding box 1910. The right-facing camera image 1908, the outward-facing camera image 1906, and a portion of an inward-facing camera image (that depicts an empty driver's seat) are shown together to indicate how multiple camera views may be presented together in a safety manager portal.

In this situation, the facial covering may be detected when the driver enters the vehicle after making a delivery (not shown). When this occurs, the driver may be credited as being compliant with the policy even if the facial covering was detected as not being worn in the last frame that the driver was visible before leaving the vehicle.

Additional options are also contemplated including: utilizing side cameras to verify additional compliance with a facial covering policy; or utilizing auxiliary cameras to verify additional compliance with a facial covering policy.

Model Training

Figure 20:
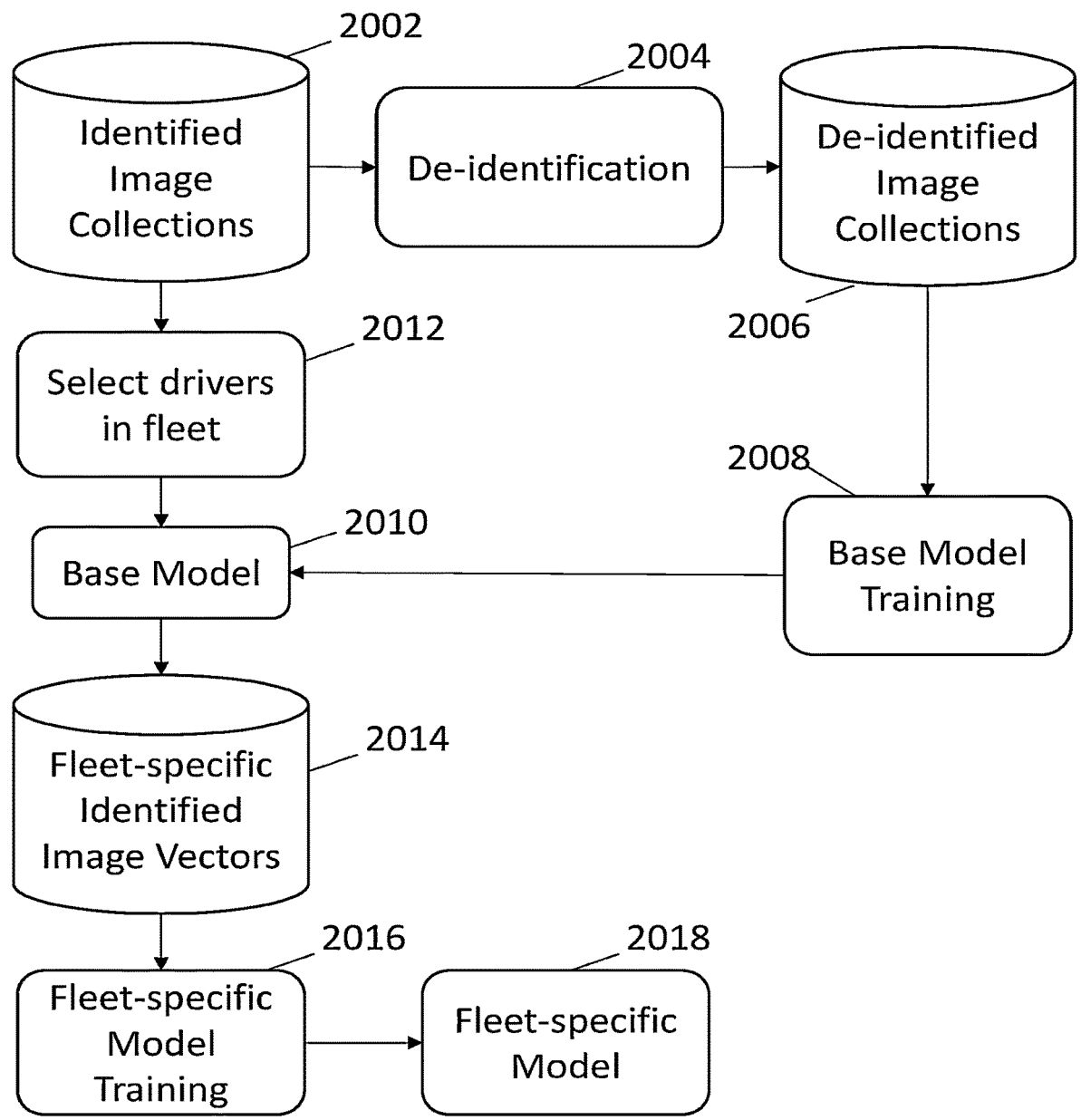
FIG. 20 illustrates neural network model training in accordance with certain aspects of the present disclosure.

FIG. 20 illustrates decoupled training of two neural network models that together may sequentially process driver images as part of a driver authentication system. For example, as described in relation to FIG. 17A, a Driver Image 1704 may be processed by a Base Model 1710 to produce an Image Vector 1712, which may in turn be processed by a Fleet-Specific Model 1714 to produce a Driver ID. In this way, the driver who is the subject of the Driver Image 1704 may be authenticated to drive in a vehicle belonging to the fleet that employs the driver. In some embodiments, the second neural network model may be trained using based on the user-provided associations between representative images and candidate driver IDs, as described above. Whereas the first neural network model may correspond to an image embedding function that was trained as the result of multiple image processing tasks (which may or may not include driver authentication), the second neural network may be particularly tuned for performing authentication for drivers within a specific fleet.

As an example, whereas a first neural network model may be trained so that it computes an embedding function that may separate (in an embedding space) images of people wearing sunglasses from those same people not wearing sunglasses, the second neural network may collapse these two groups, but such that different drivers may be separated from each other. The first embedding space may contain a representation from which one may read out whether the person is wearing sunglasses, while the second embedding space (i.e. an output or intermediate layer activation of the second neural network) may not preserve this information. Still, the second embedding space may drive apart images of different drivers who are both wearing sunglasses (or a facial covering, baseball cap, etc.) as separation of these clusters for different people may facilitate the driver authentication purpose of a Visual Login System.

As illustrated in FIG. 20, a computing system, such as a cloud-based computing system that is communicatively coupled to a multitude of driving monitoring systems, may collect and store Identified Image Collections 2002. For example, the cloud-based computing system may be configured to receive Driver Image data from multiple vehicles and assign Driving Data to an appropriate driver based on the Driver Image data, as illustrated in FIG. 17A. Over time, the system may accumulate Identified Image Collections 2002 which may be include all or many of the Driver Images that were collected and identified in this way, organized such that each Driver Image in a collection is associated with one Driver ID. This database of Identified Image Collections 2002 may then be used, after certain additional manipulations described below, to train a (first) Base Model 2010 and/or a (second) Fleet-specific Model 2018.

According to the method illustrated in FIG. 20, the training of these two models may be decoupled such that Base Model Training 2008 is performed on De-identified Image Collections 2006, which may be substantially the same as Identified Image Collections 2002, but with personal identifiers removed in a de-identification processing step 2004. While a Base Model 2010 could also be trained directly from Identified Image Collections 2002, the additional de-identification processing step 2004 may serve a data minimization purpose that leaves less personal data exposed to unauthorized access. In addition, there may be a privacy-oriented policy of training driver authentication models on no more than a certain pre-determined number of individuals, such as 1000 individuals. Such a policy may decrease the utility of such models for unauthorized purposes and therefore decrease the likelihood of corresponding unauthorized uses. Accordingly, the de-identification processing step 2004 may provide privacy at little to no cost to the performance metrics of the resulting Base Model 2010. Performance metrics of the resulting Base Model may include, for example, the average separation of driver images associated with different unknown drivers in the embedding space defined by the Base Model. Performance metrics for the Base Model could also relate to different visual processing tasks, such as separation in the embedding space of drivers who are versus who are not wearing a facial covering.

The Identified Image Collections 2002 may include image collections from multiple vehicle fleets. This may be useful for training a base model that is generally able to distinguish between any random sampling of drivers. However, within the context of a driving monitoring system installed into all or most of the vehicles of a vehicle fleet, the primary purpose for model training is to distinguish between the current drivers who are employed by the vehicle fleet. These are the drivers who are expected to be in any of the vehicles. While there may be value to determining if the driver of the vehicle is not an employee of the fleet (i.e. is an unauthorized driver), this case may be handled by determining that the Driver cannot be confidently authenticated on the basis of the Driver Image.

For the purpose of driver authentication, a Fleet-specific Model 2018 may be trained 2016 based on Fleet-specific Identified Image Vectors 2014. That is, the Image Vectors may be treated as input data and the correct driver ID associated with each image vector may be treated as a label for a machine learning system, such as a neural network. The Image Vectors themselves may have been generated by processing a selection of the Identified Image Collections 2002 corresponding to drivers in a specified fleet, such as by a SELECT query to a database that may select drivers in the specified fleet 2012. These driver image collections from the same fleet may then be processed by the Base Model 2010 to produce the Fleet-specific Identified Image Vectors 2014 that are to be used in Fleet-specific Model Training 2016 to produce the Fleet-specific Model.

The training of each Fleet-specific Model 2018 (assuming that one fleet-specific model may be trained for each active fleet) may be decoupled from the training of the Base Model 2010, in the sense that the Base Model 2010 may be frozen periodically, and multiple Fleet-specific models trained based on the embedding space defined by the frozen version of the Base Model 2010.

In another example, a number, N, of samples for training a fleet-specific model to operate within a Visual Login System may be selected according to a metric applied to the group. For example, the N samples that are most spread out in the embedding space generated by the Base Model 2010 may be selected. The spread of a training examples in the embedding space may be considered a proxy for a diverse set of training images that spans the extent of the embedding space that is covered by any driver. Techniques such as this one may enable similar levels of fleet-specific model performance (which may equate to similar levels of Visual Login accuracy) in comparison to fleet-specific models that are trained on much larger numbers of training samples but that may include many training examples that are similar to each other. By using techniques, such as this one, to select training examples that represent different locations within the embedding space generated by the Base Model 2010, the overall system may be able to minimize the number of stored images in the database of Identified Image Collections 2002. This may be considered another privacy-enhancing manipulation since it leaves less personal data exposed to the possibility of unauthorized access.

In some embodiments, the problems associated with driver login of team drivers may be mitigated by affirmatively training a VLS to distinguish passengers and other non-drivers. An example of a team-driving scenario could be that of a parent and teenage child. The parent may normally be teaching the teenage child how to drive. Accordingly, the system may learn to identify the driver and the passenger as separate groups of clusters (separate because they are different people) and may also learn that the teenage driver tends to drive at a time that the parent is a passenger. In this example, by explicitly learning this relationship, the VLS may be enabled to generate an alert when the teenage child drives the vehicle without the parent present, and the like, if generating an alert for driving without one's parent would be appropriate at that stage of the child's driver training.

In some embodiments, a vehicle to driver association may be noted, such that subsequent application of the Visual Login System on new data may be biased in favor of drivers that are known to drive the vehicle from which the new driver image data were captured. With respect to the decoupled model training illustrated in FIG. 20, the database of Identified Image Collections 2002 may include vehicle identifiers, so that the vehicle from which each driver image was captured is available. This information may then be removed by the De-identification step 2004, but may be propagated down through the Select Drivers in Fleet step 2012, so that the database of Fleet-specific Identified Image Vectors contains image vectors and associated vehicle identifiers. Both of these data types may be used as inputs to Fleet-specific model training 2016 so that the resulting Fleet-specific Model 2018 may be used to authenticate the driver on the basis of the image vector and the vehicle identifier. This may result in higher driver authentication precision for fleets that tend to assign certain drivers to driver certain vehicles, but may be less helpful (or even counter-productive) for fleets that assign drivers to vehicles in an effectively random manner.

In some embodiments, fleet level constraints may be employed to invalidate VLS predictions. For example, a fleet may employ one hundred people who may drive vehicles in a large region of the country. On any given day, a centralized process may check to see whether any of the one hundred people are "authenticated" in more than one vehicle, are authenticated in two different locations that are far apart from each other at within a short range of times, and the like. In these embodiments, therefore, there may be a constraint that is complementary to a "one driver at a time rule" for vehicles—"each driver may only drive one vehicle at a time." In this way, suspect VLS classifications may be flagged or invalidated based on conflicts at the fleet level.

In some embodiments, a VLS may determine a probability that a submitted driver image is one of N previously trained-upon drivers, even if the identity of the trained-upon driver is not yet known to the Visual Login system. As an example, a Fleet-specific Model may be trained on Fleet-specific Image Vectors, some of which are identified (have been associated with a driver ID by a person who is familiar with the driver) and some of which are not yet identified but that have been linked to other driver image vectors on the basis of Driver Invariant Sessions.

In some embodiments, a VLS may be configured to authenticate drivers in a two-step process. In a first step, the trained VLS may predict one of N previously trained-upon drivers. In a second step, an embedding location of the submitted driver image may be compared to linked cluster locations associated with known and unknown but trained-upon drivers (and further, in some embodiments, compared to cluster locations associated with unknown and un-trained-upon, but previously observed drivers). In this way, a VLS prediction with low confidence may be bolstered or suppressed depending on whether the corresponding embedding location is near to a previously computed cluster center in the embedding space.

In some embodiments, driver login data, whether it be visual login-based, app-based, beacon-based, or ELD-based, may be given a higher weighting depending on how fast the vehicle is moving. In these embodiments, the speed of the vehicle may be a proxy for a likelihood that the correct driver has triggered the login mechanism, and further, that the driver is actively engaged in driving in a forward direction, and not, by contrast, engaged in moving the vehicle to a new location in a parking lot.

In some embodiments, a driver identifier may be associated with driving data based on a series of VLS classifications. There may be a voting mechanism, such that the driver with the highest number of votes may be assigned to a particular DIS.

Figure 21:
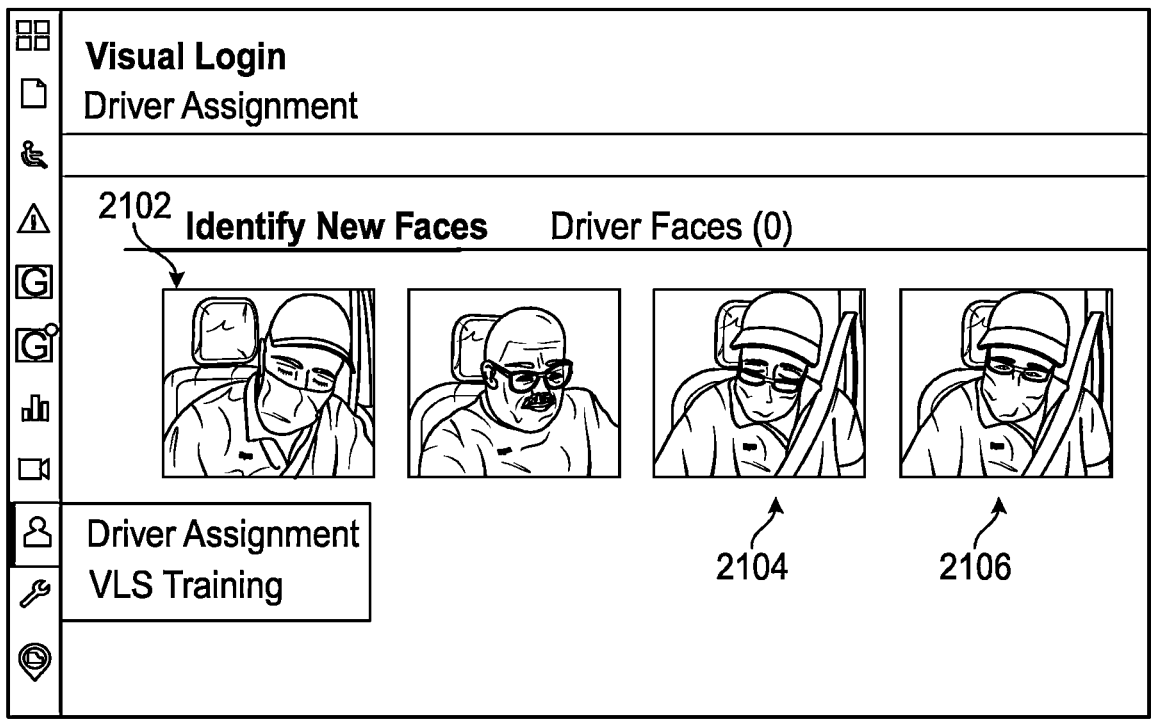
FIG. 21 illustrates a technique for preparing training data to train a classifier to identify a driver who may or may not be wearing a facial covering in accordance with certain aspects of the present disclosure.

In some embodiments, a link between two clusters may be selectively broken by a user. For example, the user may see a display containing a representative image of each of the labelled drivers, and/or each of the unlabeled new faces. FIG. 21 illustrates an example of a display containing 4 representative images, each representative image corresponding to a cluster of images that are associated with a driver that the VLS could not authenticate. Representative image 2102 and representative image 2104 are collected from the same individual at different times. The driver depicted in representative image 2102 was not wearing glasses. In representative image 2104 this same driver was wearing glasses. The driver in each of the representative images 2102 and 2104 is depicted wearing a facial covering. In response to clicking one of the images, a separate window may appear in which each image in the separate window is a representative image that is near a centroid of a different cluster in the linked group that is associated with the image that the user initially selected. The user may notice that this detailed view of representative images of clusters assigned to the single driver contains images of two or more drivers. In this case, the user may select a pair of non-matching driver images (where the images are of different drivers) or an image that does not match the initially selected image, and then indicate that links that associated this second selected image with the first should be broken. According to some embodiments, a path from the first cluster to the second may be determined, and a link broken according to connectivity patterns of the resulting network of linked clusters. For example, a link that connects two otherwise disconnected groups may be selectively removed. In some embodiments, a link that would substantially reduce a number of paths from the first cluster to the second would be selected for removal. Links that are selectively removed may also be links that are connected across a DIS that includes vehicle stops.

In some embodiments, driver images may be selected for training based on the presence of distracting or occluding objects. In one example, it may be useful for the VLS to authenticate a driver who is wearing a facial covering. If there are only a few examples of the driver wearing a facial covering in the training set, the driver image selection mechanism might temporarily bias the system towards the collection of images that might include facial covering. Referring again to FIG. 21, a system enabled by certain aspects of the present disclosure may preferentially select representative images of drivers who are wearing facial coverings, such as representative images 2102, 2104, and 2106 in a Driver Assignment view. The likelihood of facial coverings could be ascertained based on non-identity readouts of the embedding data, which may be a different task on which a base model has been trained and/or may involve a different neural network head that is trained to perform non-identity readouts, including whether the driver is wearing a facial covering, on the basis of embedding data. For example, a separate neural network head may be trained to determine whether or not a person is wearing a facial covering, irrespective of who that person is. In this case, the facial covering readout that is trained on some drivers could be applied on newer driver image data to identify candidate images of the driver when he or she is wearing a facial covering.

Figure 22:
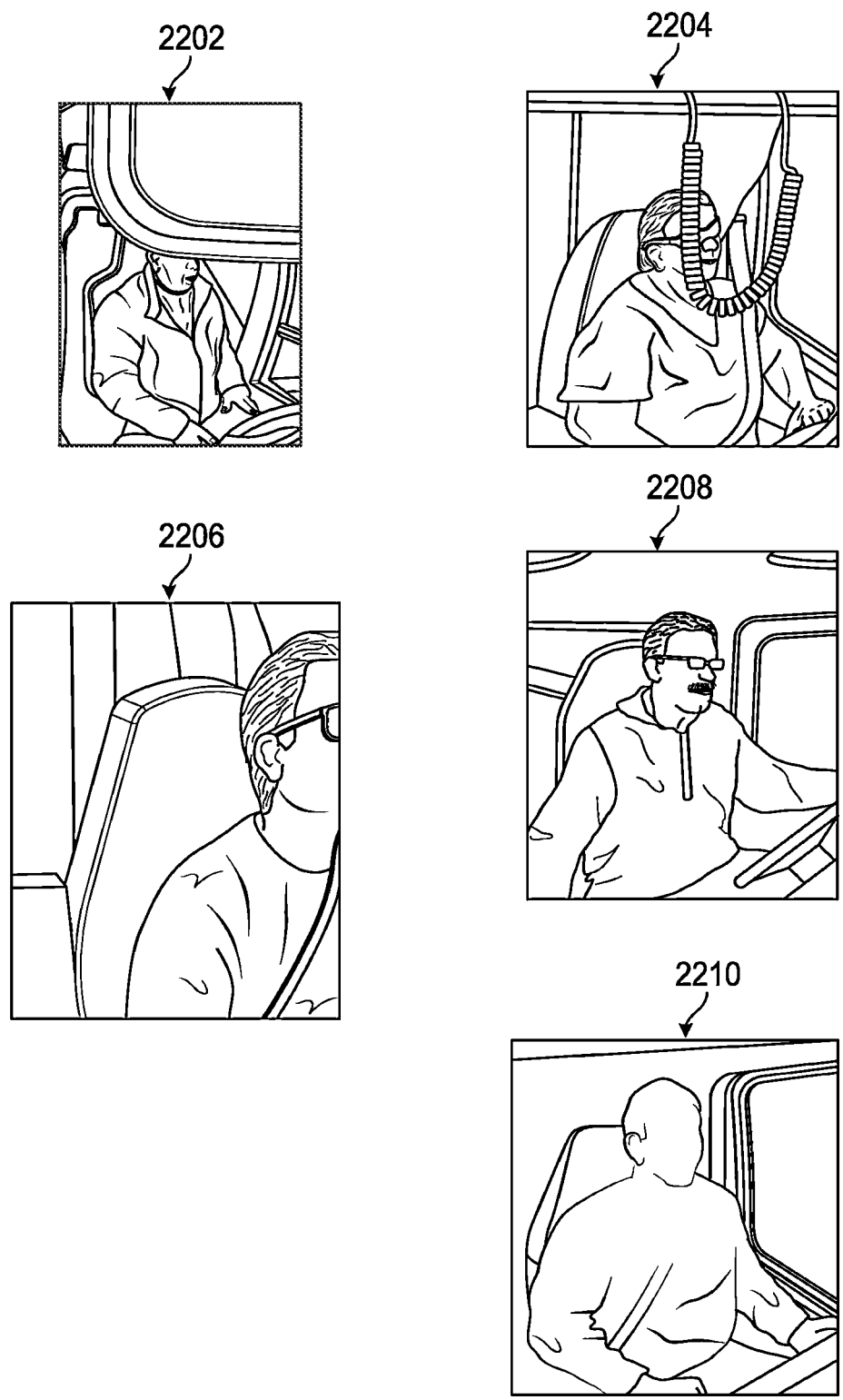
FIG. 22 illustrates various examples of challenging driver detection situations.

Likewise, a VLS may be configured to detect examples of one or more challenging driver authentication scenarios, to facilitate accumulation of substantial and relevant training sets. For example, the VLS may preferentially select images that were captured in darkness or with high-contrast shadows. FIG. 22 illustrates a number of challenging driver authentication scenarios. These may include camera obstruction 2202 for which the inward-facing camera's view of the driver may be partially or fully obstructed, such as by a windshield visor. Another challenging scenario is illustrated in 2204, which depicts a scene in which a dangling wire is situated between the inward-facing camera and the driver. Still another challenging scenario is illustrated in 2206 and may be referred to as a "Field of View" issue. In this example, the driver is seated such that the whole of the driver's face is not contained within the field of view of the inward-facing camera. As mentioned above, and as illustrated in 2208, driver images that are captured in darkness, such as at night, may present a challenging authentication scenario. As illustrated in 2210, too much light may cause a saturation effect, so that fine features of a driver's face may be obscured. A VLS enabled to detect this situation may then delay visual login until a later time when more even lighting may be available. In another aspect, a driver monitoring system may repeatedly perform a face verification process, in which two successively collected images are submitted to a neural network which determines whether or not the images belong to the same person. This may be an alternative or additional way of establishing the duration of a Driver Invariant Session and consequently linking driver images in a training database. While every image during a DIS may be likely to trigger a "same person" response, the possibility that a subset of the images elicits the opposite response could be used as part of a technique to identify hard authentication or verification examples. Such hard examples may include, for example, driver images for which the driver's face is partially out of the camera's field of view.

Certain aspects are directed to including deidentified face pools into the training process, so that a VLS may learn to predict that a submitted image is either one of the N drivers that belong to the fleet or is an outside driver. This may be accomplished even though all driver identifier information is removed from the anonymized face pool, since the driver images of the deidentified face pool are treated as a type of background class in this case. In some examples, a VLS may categorize a new face or an unknown face with a predetermined code, such as '−1.' When a DIS contains more '−1' categorizations than categorizations as one of the known drivers, the system may be more likely to determine that the driver images collected during the DIS belong to a new driver.

In some embodiments, representative images that are shown to a user may be sorted such that new faces having larger numbers of associated faces are more likely to be presented to the user, to be presented near the top of the window, etc. This may facilitate training on new driver images since representative images associated with larger training data sets may be more readily trained to a desired level of precision. Furthermore, in some embodiments, representative images of new faces may only be displayed if there is at least a threshold number of images in linked clusters and/or the linked clusters span a threshold number of Driver Invariant Sessions or days. These design choices may focus the efforts of a human labeler on representative images from actionable linked clusters, meaning linked clusters on which training may commence as there are sufficient training examples. Similarly, representative images may only be shown from root clusters that have at least a threshold number of linked clusters as this may avoid bad user experiences with unhelpful clusters. In this way, representative examples of connected sets may be displayed to the user to facilitate one-click driver assignment.

In some embodiments, clusters for which representative images have been displayed to the user, but not selected by the user for one-click labeling may be ranked lower for subsequent presentations. In some cases, older clusters that have not been selected, and to which new images have not been added, may be "forgotten" or deleted after a new face retention period. In some embodiments, older clusters may be rejuvenated in the sense that a different representative image may be chosen, and/or a different cluster may be chosen as the root cluster for the linked group. Images that are forgotten in this way may be used, together with stored images that were chosen, to train a classifier to predict which types of representative images are more likely to be chosen by a user engaged in the manual task of one-click labeling.

In some embodiments, a VLS may be designed such that personally identifiable Driver Identifiers, such as Driver Name, are never associated with a group of linked clusters. In such systems, the name of the driver may be kept private, and the data may still be properly associated with a driver using the same mechanism, only linked by a pseudonym rather than an actual driver identifier. In some embodiments, a representative image may be used in place of a name in a Driver Monitoring application/portal.

In some embodiments, proxy driver identities may be associated with historical driving data until such time as the driver is identified. In some embodiments, a one-click (or otherwise) driver identification may then be applied retroactively so that Driver Historical Scores and Trends may be computed. This technique may further enable a "quick start" of a VLS. According to this technique, the Driver Monitoring System may be functional immediately, and selected driver images may be stored, so that driver to drive time associations may be made after a few days or weeks during which sufficient VLS training data is collected.

In some embodiments, linked clusters may be associated with one or more driver names through a separate driver login system. For example, linked clusters may be associated with a single driver name based on ELD data. In another example, linked clusters may be associated with multiple driver names based on ELD data. In the former case, the ELD data association may be used to assign visual driver image clusters to a driver name. In the latter case, a user may be presented with a reduced list of possible driver names/IDs, such that when a user selects such a representative image, only the names that were associated with the clusters through the alternative driver login data source may be presented as options for the user to select. Likewise, such names may be presented at the top of the list.

In some embodiments, a VLS training session for which the VLS may update neural network weights based on the currently labeled data, may be started periodically, in response to a new user-provided label, or in response to the accumulation of a threshold number of training images for at least one driver. Similarly, new training may be started in response to the collection of known drivers in the context of a challenging scenario, such as darkness 2208 or partial occlusion 2206.

Figure 23:
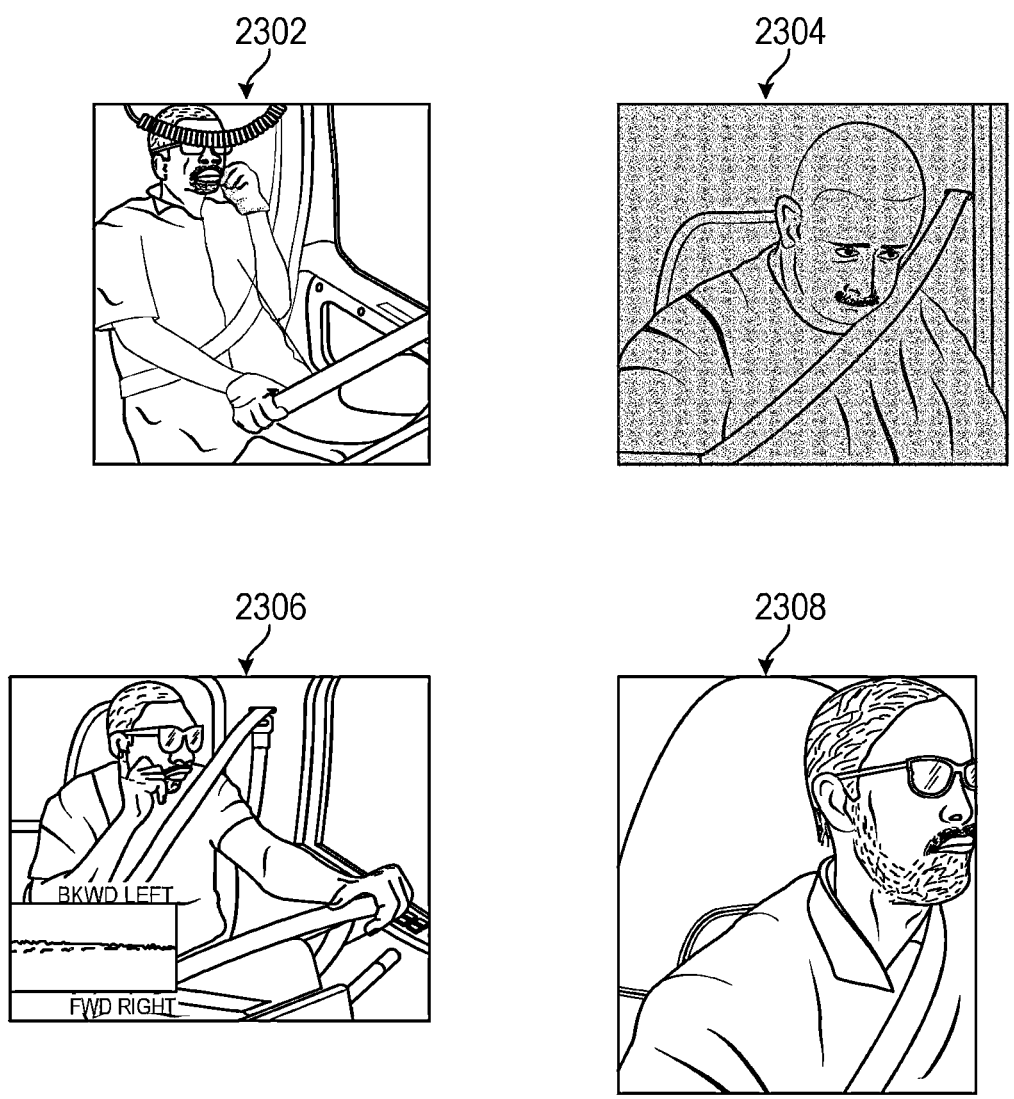
FIG. 23 illustrates various examples of challenging driver behavior classification situations.

Certain aspects of the systems and methods described above in relation to Visual Login may also be beneficially applied to other aspects of a driver or driving safety system, such as an IDMS. For example, a driver or driving safety system may detect that a driver is talking a phone while driving, texting, looking away from the road for unsafe periods of time, or in some other way distracted, drowsy, and the like. Some of these scenarios are illustrated in FIG. 23. A driving safety system may mistakenly detect that a driver is holding a phone; however, a driver may not be holding a phone, but may be wearing gloves as, in image 2302, or touching his face, as in image 2306. A driving safety system may mistakenly detect that a driver is looking away from the road; however, a driver may have his head facing down with his gaze on the road, as in image 2304. A driving safety system may mistakenly detect that a driver is looking in some way distracted, drowsy, and the like; however, is wearing sunglasses, which make it more difficult for the driver safety system to determine where the driver is looking, as in image 2308.

As described above with respect to Visual Login scenarios, a driver or driving safety system may trigger training of, for example, a neural network based visual perception engine, in response to the accumulation of a threshold number of training images of certain identified classes of challenging scenarios.

Driver Login Management from a Cloud Server

Driver Login information may come from many sources, including ELD (Electronic Logging Device) integration, an IDMS console, CSV uploads, from devices via explicit "upload/driverLogin" calls, from devices via alert events, from observations payloads, and in the absence of other information, from "default driver" associations.

Devices may determine who is driving using BLE beacons and may communicate to a cloud server who is driving—driver or unknown with every payload it sends. Sending driver information with every payload may avoid issues of misattribution of events, provided that there is a method to correct mistakes at the device level. For example, in situations in which payloads are sent before BLE beacons are detected, that data can be corrected from the device via explicit upload/driverLogin calls.

For some embodiments, fleets may have ELD set up. Information from an ELD can be retrieved by the IDMS backend via a third-party ELD aggregator service. This data can be used to determine who was driving a particular vehicle with a lag of a few hours. According to certain aspects, a lag associated with reconciling different cloud-based driver login databases may be resolved based on a system that may correct earlier driver login data via a cloud reconciling process.

Driver Login information might be changed, or corrected, which may associate driving data (alerts, tasks, sensor data) with another driver. In some embodiments, safety managers may correct data via a UI, or by uploading CSV files.

A cloud server may track device-to-vehicle, and vehicle-to-driver associations. The cloud server may, in some embodiments, reassign a vehicle-to-driver association for a specific time span. For certain fleets, there might be a configuration-driven option (e.g., settable in a fleet portal) that may specify the use a default driver instead of "unknown" when the device communicates that the driver is unknown.

In some embodiments, a driver assignment page may show merged entries for driver logins (that will be merged on the server), and the UI may query for the unmerged entries if the console user requests for it.

A database design may include a definition of a "login-interval" that may be a period for which a vehicle is associated with a (known or unknown) driver. A cloud server may track login-intervals in a "driver_login" table, which may have multiple fields, some of which may be optional, including: vehicle_id, driver_id, start_time, end_time, source, source-extended, beacons, user, datetime-created-on, datetime-updated-on. An unknown driver may be represented with a null driver_id. The source-extended column may be used to track lower priority sources when login data are merged, and/or may be displayed in the UI.

As mentioned above, the different sources of Driver Login information may be configured with relative priorities so that a login merge process may determine whether or not to allow a reassignment. In this example, a cloud server may track the source of any particular Driver Login information so that modifications may be allowed or disallowed. This order of preference may be customizable. In some embodiments, a default order (in descending order of priority) may be: (1) CSV, or UI modifications (source: "csv"); (2) ELD data (source: "eld"); (3) Device via explicit upload/driverLogin calls (source: "device"); (4) Device via payloads (source: "metadata"); (5) Default driver, if payload has unknown (source: "default"). In this priority list, Visual Login may be an example of priority group (3). In the above list, it may be appreciated that ELD data may be prioritized above Visual Login data as a default because initial performance of a Visual Login System may be poor. As the Visual Login performance improves, it may be prioritized higher than ELD data.

In some embodiments, driver login data from various sources may first be accumulated in a "driverlogin_audit" table that will contain information for auditing the entries in the "driverlogin" table.

According to certain aspects, API endpoints may include be configured such that driving related device APIs will include a "driver" key to identify the driver. API calls may include: (1) upload/driverLogin which may be called from the device; (2) tenants/{tenantId}/update-driver-login which may be called by a fleet-facing console, such as an IDMS console; and (3) internal/{tenantId}/update-driver-login which may be called by an ELD integration script. In the above, "{tenandID}" may refer to an identifier of a particular fleet.

Reassignment

A reassignment may occur when a driver association with a vehicle conflicts another driver association with a vehicle. In some embodiments, a system may reassign the data that is in conflict and may update "driverlogin" database table entries to reflect the new information. According to certain aspects, entries in the "driverlogin" database table might be deleted, modified, split, or merged as appropriate.

As an example of a driver login conflict, the system may ensure that there is only one driver associated with a vehicle for any point in time. Thus, the "driverlogin" table will not contain overlapping entries (in time) for one vehicle. For debugging and auditing purposes, the "driverlogin_audit" table will contain unmerged, potentially overlapping, entries as received from external sources. By receiving new driver login data in the "driverlogin_audit" table, but presenting driver login data to other cloud services via the refined "driverlogin" table, the system may be both responsive to updating data and also capable of self-correction over short time periods.

Reassignments may cause driving data to be modified for certain intervals, that are calculated from the updated "driverlogin" table entries. For each interval that is reassigned, the following related data points may be modified: (1) driving data (alerts, sensor-data) within the login-interval's time range with that driver; (2) driver score, and driver speeding for all "affected" drivers and time intervals, where "affected" drivers includes both current and previous drivers (before and after the assignment). In some embodiments, multiple reassignment-based changes may be computed in batch mode.

According to certain embodiments, for each new Driver Login "entry", (NEW), NEW will be inserted into nddriverlogin_audit as-is. NEW will then be processed for nddriverlogin and will be either (in this order): split, rejected, merged, or inserted as is. Furthermore, processing NEW might cause existing entries (OLD) to be: split, modified, or deleted. Continuing with this illustrative method, an entry NEW may have the following fields: driver NEW.D, vehicle NEW.V, start_time NEW.B, end_time NEW.E, and source NEW.S. Values for start_time B, and end_time E, may be stored as milliseconds from Unix epoch. A "day" may refer to a day in the tenant's time zone; usually 24-hours starting at midnight, except when switching to or from Daylight Savings Time, when it may span 25 or 23 hours.

In this example, existing entries OLD, being referred to below, are of the same vehicle as NEW, and from the same day, i.e. OLD.V=NEW.V, and day(OLD.B)=day(OLD.E)= day(NEW.B)=day(NEW.E). A "drive-gap-merge-threshold(S)" may be a maximum time difference between the end of one login_interval and the start of the next login_interval, below which two login_intervals (both of source S) may be merged.

If NEW spans multiple days, it may be split by time, into smaller entries ($NEW_1$, $NEW_2$, ...) so that each entry falls within a day. Each of $NEW_1$, $NEW_2$, ... may then be processed.

For each entry OLD, whose start_time or end_time is spanned by the login_interval of NEW, we will split NEW into parts that overlap OLD, and parts that do not. All these parts $NEW_1$, $NEW_2$, ... will then be processed.

If there exists an entry OLD, that overlaps NEW, i.e. OLD.B≤NEW.B and OLD.E≥NEW.E, then: (1) if OLD.S=NEW.S, and OLD.D=NEW.D, then we do nothing, or (2) if (OLD.S=NEW.S and OLD.D≠NEW.D) or (OLD.S<NEW.S), then OLD is split into a part that overlaps NEW ($OLD_0$), and parts that do not overlap NEW ($OLD_1$, $OLD_2$). $OLD_1$, and $OLD_2$ are saved, and $OLD_0$ is deleted. NEW may then be merged or inserted below.

Continuing with the illustrative method, at this stage of processing, NEW may either sit completely within the login_interval of some OLD entry of higher priority or may be outside the login_intervals of all OLD entries. In this example, NEW is rejected if there exists an entry OLD in the table that spans NEW, that came from a higher priority source; that is, OLD.S>NEW.S, and OLD.B≤NEW.B, and OLD.E≥NEW.E. In the case of rejection, the entry NEW may be completely ignored, with no trace in driverlogin table. If NEW is not rejected, it may be either merged or inserted below.

Subsequently, if NEW was not split, and NEW was not rejected, and NEW does not overlap another entry, the illustrative method may proceed as follows. If NEW has adjacent entries by time, $OLD_1$ and $OLD_2$ (left and right) with the same driver and source, then NEW can be merged into $OLD_1$, or $OLD_2$, or both, if the difference in time between their login_intervals is ≤ drive-gap-merge-threshold(NEW.S). If NEW is not merged, it may be inserted below.

A driver login insert may arise when NEW does not overlap with any other entry, and NEW was not merged into another entry. In this case, NEW may be inserted into the "driverlogin" table.

Wake on Motion

For certain embodiments, it may be beneficial to initiate a hardware device wake-up prior to the time of an ignition-on event. For example, if a driver expects to interact with the hardware device prior soon after entering the vehicle, but the device wake-up sequence duration is such that the driver would need to wait, the device may, based on certain aspects disclosed herein, commence a wake-up sequence triggered on an event that tends to predict a subsequent ignition-on event rather than wait for the ignition-on event itself.

In addition, it may be desirable to initiate a hardware device wake-up based on a trigger that can be detected without a wired connection to ignition circuitry. According to certain aspects, a device wake-up sequence may be triggered based on motion signals which may be detected in a self-contained device having a motion sensor. This arrangement may simplify the device installation procedure and reduce the number of failure points that may affect device longevity.

Accordingly, a vehicle-mounted driver and driving monitoring device may be configured to wake up on the detection of motion. The device, so configured, should also shut down when the vehicle is not in motion for a configurable about of time, so that excessive power consumption and battery drain may be avoided during false alarms (false wake ups). In addition, according to certain aspects, the device may be configured so that it may ignore false wake ups in noisy environments. Further, the device may be configured to shut down gracefully in case of the mechanisms used to shut down fail.

Figure 24A:
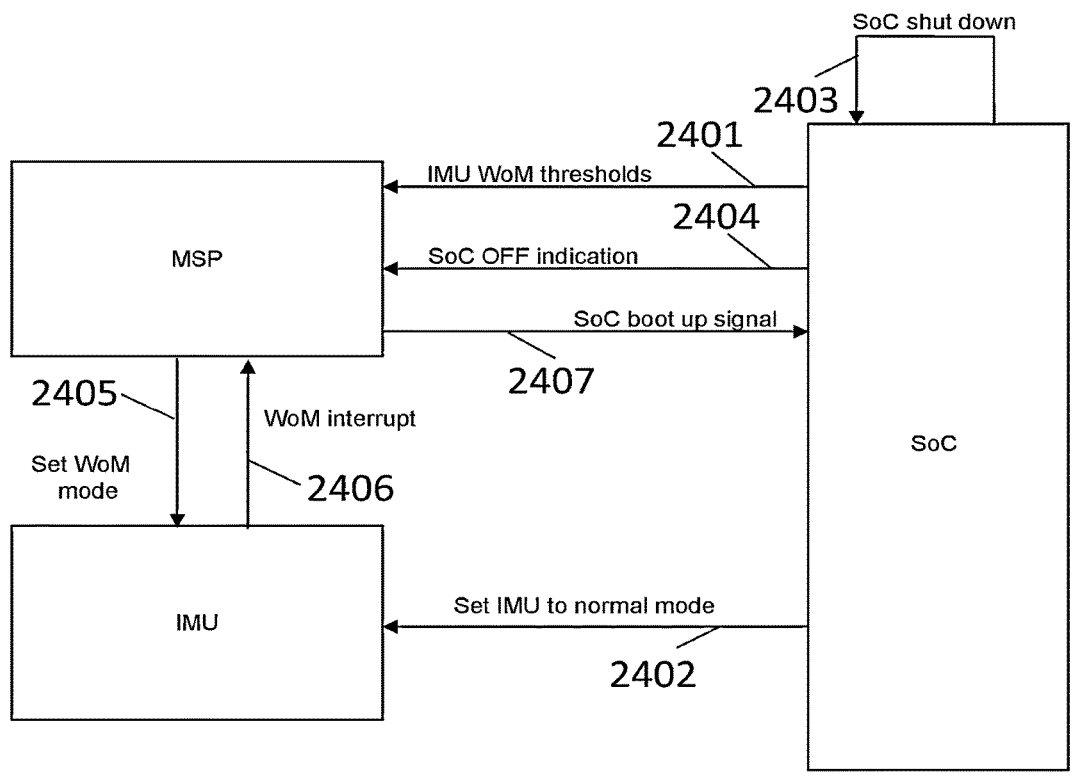
FIG. 24A illustrates a boot up sequence in accordance with certain aspects of the present disclosure.

FIG. 24A illustrates a boot up sequence. The blocks include: an Inertial Measurement Unit (IMU) which is an Always ON module, a Boot up micro controller (MSP) which is an Always ON module, and a System on a Chip (SoC) such as may be provided by Qualcomm, Inc., which is the chipset that may be booted up or shut down, in accordance with the diagram. The diagram also includes Wake on Motion (WoM) thresholds and signals. As illustrated, the boot up sequence is hardware driven and involves an IMU and MSP. The IMU is a device that can measure both acceleration and angular velocity. IMU is connected to the always ON domain of the board.

The boot up sequence includes a WoM mode. The IMU has a motion detection capability. Motion detection occurs when a sample of data is read that exceeds the user-programmed threshold in any axis. WoM detection is communicated via interrupt 2406. When IMU is in WoM mode, it is also in low power mode so that battery does not get drained out when SoC is OFF. As illustrated in FIG. 24A, PMU WoM thresholds 2401 are set during a previous boot cycle. These thresholds would be based on the field data. MSP is a boot up micro controller that is purposed to manage power sequences for SoC, and the MSP is always ON. When the SoC is in power OFF state, as communicated to the MSP by an SoC OFF indication 2404, the IMU would be set in WoM mode 2405 and MSP waits for WoM interrupt 2406 from IMU to turn ON (boot up) the SoC 2407. A qualifying WoM motion sample may be one for which a high passed inertial measurement sample from any axis has a positive or negative magnitude exceeding a user-programmable threshold.

WoM configuration may include the following steps. First, a check is made to ensure that the accelerometer within the IMU is running. Second, the accelerometer is configured as 'Bypass Low Pass Filter (LPF)' so that higher frequency signals may be processed. Third, motion interrupt is enabled to enable interrupts for all of x, y and z axes. Fourth, motion thresholds are set 2401, for example, at 0.32 G for all 3 axes. In field testing, current consumption of WoM mode is around 120 micro Amps with root-mean-squared baseline noise of 0.0033 G. Fifth, WoM Interrupt Mode is set 2405, so as to enable interrupt either with OR or AND of the x,y,z axes (a default configuration may be OR). Sixth, accelerometer hardware intelligence is enabled, which may refer to SoC internal logic. Seventh, a frequency of Wake-Up is set, for example, at 333 Hz. Eighth, cycle mode is enabled as accelerometer low-power mode. WoM configurable parameters may include imu_wom_enable and imu_wom_threshold. The parameter imu_wom_enable may be a flag to check if IMU WoM feature should be considered for SoC boot up, and may be set to False by default. The parameter imu_wom_threshold may be a threshold for an axis to detect WoM interrupt, and may be set to 0.32 G by default.

In typical operation, the boot up sequence may include the following steps. Whenever SoC is booted up, set the IMU WoM thresholds 2401 to MSP. Set IMU to normal mode 2402. SoC shuts down 2403. SoC OFF indication 2404 reaches MSP. MSP sets IMU to WoM mode 2405 with thresholds given earlier by SoC. When there is WoM interrupt 2406, MSP detects it. MSP turns ON SoC 2407.

Figure 24B:
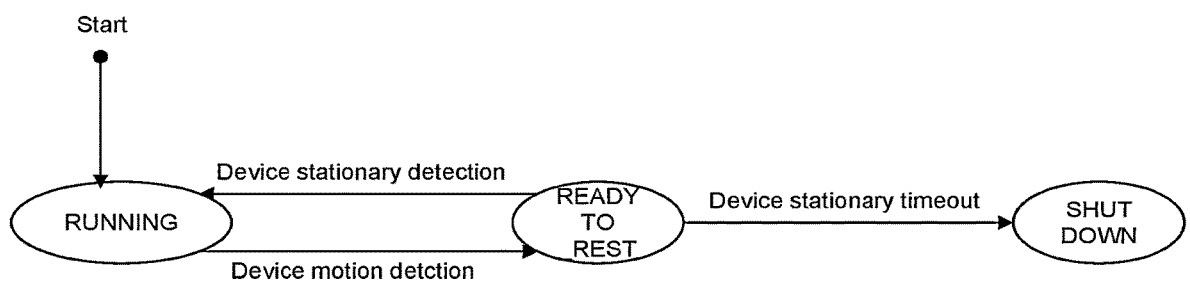
FIG. 24B illustrates a state diagram for device motion states in accordance with certain aspects of the present disclosure.

In typical operation, a shutdown sequence may be software driven. To detect if the device is stationary or in motion, inputs may be considered from multiple sources. In one embodiment, GPS and IMU data may be used to detect if the device is in motion. FIG. 24B provides an overview of the shutdown sequence. A SHUTDOWN state indicates that the device is at rest for a configured amount of time and is ready to be shut down. A READY TO REST state indicates that the device just came to stationary position from motion. In this state, the device waits for an event (either motion or device not moving for configured amount of time) to move to RUNNING or SHUTDOWN states. A RUNNING state is an initial state of the state machine that indicates that the device is moving. State transitions may include: Device stationary detection, which indicates that the device has become stationary; Device motion detection, which indicates that the device started to move from being stationary; and Device stationary timeout, which indicates that the device has stationary for configured amount of time (e.g. 180 seconds) and now the SoC should be shut down.

As described above, GPS and IMU data may be used to detect if the device is in motion. When the device is ON, software may monitor the IMU data continuously to detect if there is no motion for shutdown signal. Thresholds used for this purpose may be different from WoM thresholds. Use of an IMU alone, however, may be unreliable in certain situations, such as in long, smooth highway rides. GPS can provide location and speed information, and is typically reliable during long, smooth highway rides, etc., and the speed information from GPS may be used to signal the device to shut down. GPS, however, may be associated with low accuracy conditions, such as basement scenarios, during which the shutdown sequence would be more accurately triggered based on IMU signals.

Figure 25A:
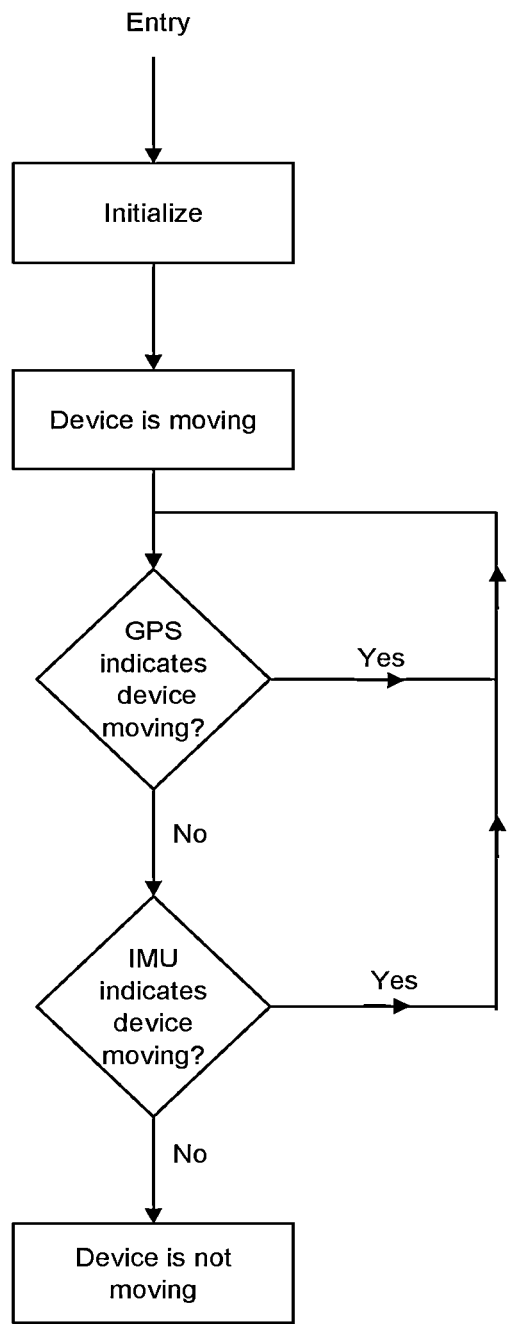
FIG. 25A illustrates an overview of input usage for device motion detection in accordance with certain aspects of the present disclosure.

FIG. 25A illustrates an overview of example logic that may be used to detect if the vehicle is moving or not using available inputs. GPS logic, described below, may detect if the vehicle is moving. The GPS logic may include a GPS temporal filter that check if the device is not moving for a configurable period of time, such as three minutes. The use of this temporal filter may avoid false motion detections associated with transient changes to the GPS estimate of position while the device is actually stationary. FIG. 25B illustrates GPS usage for detection of motion to stationary. FIG. 25C illustrates GPS usage for detection of a transition from a stationary state to motion.

Figure 26A:
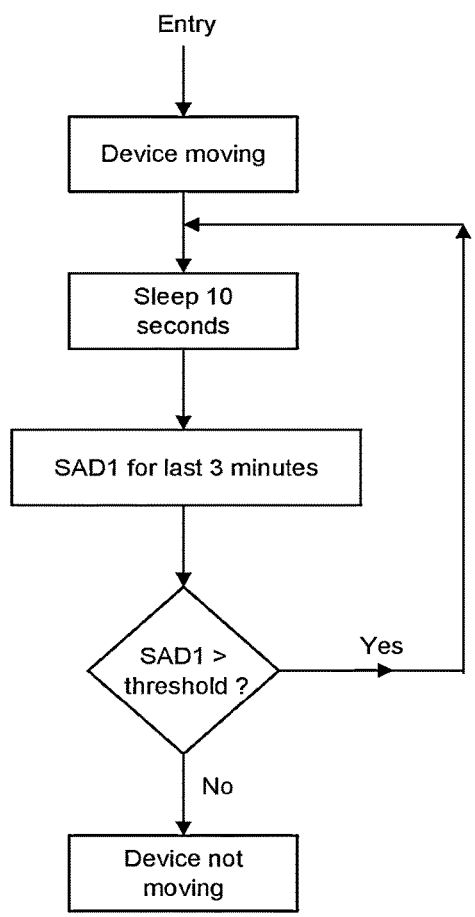
FIG. 26A illustrates IMU usage for detection of motion to stationary in accordance with certain aspects of the present disclosure.
Figure 26B:
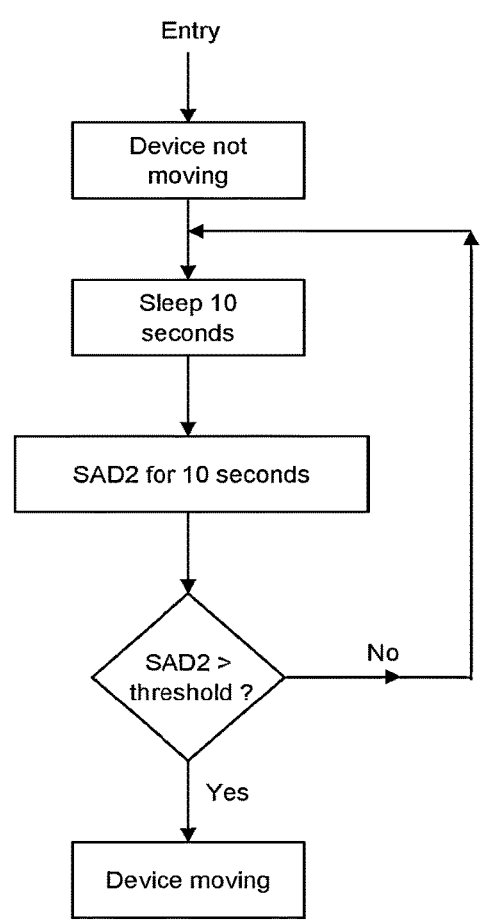
FIG. 26B illustrates IMU usage for detection of stationary to motion in accordance with certain aspects of the present disclosure.

FIG. 26A illustrates IMU usage for detection of motion to stationary. FIG. 26B illustrates IMU usage for detection of a transition from a stationary state to motion. In FIGS. 26A and 26B, SAD refers to the sum of absolute difference between consecutive samples. SAD1 is calculated over a 3 minute window and is used to detect whether the device may be considered stationary. SAD2 is calculated over a 10 second window and is used to detect that the vehicle has started moving.

Certain aspects of the present disclosure are directed to limited false boot ups, which may help to avoid battery drain. Boot up of the SoC that is dependent on IMU alone might result in false boot ups in noisy environments. Accordingly, after the device boots, inputs from additional sources, such as GPS or the Controller Area Network (CAN), may be considered to verify that the device is really in motion. Furthermore, as described above, a visual login sequence may be processed to determine if a driver is present in the vehicle. Based on one or more additional inputs, the system may confirm that the boot up was not falsely triggered. In false boot up cases, however, the system may then increase IMU WoM thresholds. For example, a counter may be used to count sequential false boot ups. After a predetermined number (which may be 1) of false boot ups, the IMU WoM thresholds may be increased so that future false boot ups are less likely. In some embodiments, the new WoM thresholds would be read from a pre-defined multi-level threshold table. In some embodiments, the WoM thresholds may be restored to default levels after a genuine (confirmed) boot up. Alternatively, WoM thresholds may persist across one or more genuine boot ups.

When the ignition line is physically connected to the driver and/or driving monitoring device, the above wake on motion design may incorporate the ignition line signal. In this example, during a boot up sequence, along with IMU WoM interrupt signals, the MSP may also monitor the state of the ignition line. If either of these inputs suggests the SoC should be ON, the boot up sequence will be initiated. During a shutdown sequence, the ignition status could again be used an additional input on which to determine whether the device (SoC) should be shut down.

In some embodiments, the MSP may also monitor CAN activity. In such embodiments, detection of CAN activity may be used in a manner similar to a WoM interrupt 2406 as illustrated in FIG. 24A. Detection of CAN activity as the basis of a device boot up may be beneficial, for example, where a driver of a vehicle unlocks the vehicle doors using passive entry, such as when the vehicle detects the proximity of a keyfob held by the driver. Similarly, the driver may press a button on a keyfob to unlock the vehicles doors, and this event may be detectable by the MSP as CAN activity.

A driver login system enabled with such early wake-up mechanisms may complete a driver authentication sequence more quickly and/or reliably. In addition, wake-up mechanisms that ingest CAN activity signals may confer other advantages to a driver safety system more generally. For example, a driver safety system so enabled may poll for diagnostic codes prior to a trip start which may offer a more complete view of the vehicle's condition. In some embodiments, the presence of uninterpreted CAN activity may be treated as a wake-up trigger. Alternatively, the MSP may interpret CAN activity so that only certain CAN messages that are predictive of an upcoming vehicle trip are used as triggers for an SoC boot up. In addition, or alternatively, the SoC may interpret CAN activity messages to confirm whether the boot up was valid or whether the device should return to low-power mode.

As used herein, the term "determining" encompasses a wide variety of actions. For example, "determining" may include calculating, computing, processing, deriving, investigating, looking up (e.g., looking up in a table, a database, or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein may be downloaded and/or otherwise obtained by a user terminal and/or base station as applicable. For example, such a device may be coupled to a server to facilitate the transfer of means for performing the methods described herein. Alternatively, various methods described herein may be provided through storage means (e.g., RAM, ROM, a physical storage medium such as a thumb drive, etc.), such that a user terminal and/or base station may obtain the various methods upon coupling or providing the storage means to the device. Moreover, any other suitable technique for providing the methods and techniques described herein to a device may be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for preparing training data for a visual login system, comprising:
    receiving, by at least one processor of a computing device, one or more driver identifiers, wherein each driver identifier corresponds to a driver who is associated with a vehicle fleet;
    receiving, by the at least one processor, a first plurality of driver images of a first driver, wherein each driver image of the first plurality of driver images was captured by a camera mounted to a vehicle, wherein the vehicle is in the vehicle fleet;
    clustering, by the at least one processor and based on an embedding space projection, the first plurality of driver images of the first driver to produce at least one image cluster, wherein a first image cluster of the at least one image cluster corresponds to a gaze direction of the driver while driving the vehicle, and wherein the gaze direction further corresponds to the driver looking in the direction of the camera;
    selecting, by the at least one processor, a representative image from the first image cluster;
    displaying, by the at least one processor and to a user:
        the representative image of the first driver from the first plurality of driver images; and
        the one or more driver identifiers;
    receiving, by the at least one processor, input data from the user, wherein the input data indicates a selected driver identifier from the one or more driver identifiers;
    associating, by the at least one processor, the selected driver identifier with every driver image of the first plurality of driver images of the first driver including the representative image; and
    training, by the at least one processor, a fleet-specific model based on the first plurality of driver images and the associated driver identifier, wherein the fleet-specific model is trained based on an input of an image vector of the representative image and the selected driver identifier, and wherein the fleet-specific model is trained to compare a candidate image to a plurality of image vectors to select a highest probability driver identifier.

2. The method of claim 1, further comprising:
    receiving, by the at least one processor, a second plurality of driver images;
    determining, by the at least one processor, that the second plurality of driver images depict the first driver; and
    associating, by the at least one processor, the selected driver identifier with every driver image of the second plurality of driver images.

3. The method of claim 1, further comprising:
    receiving, by the at least one processor, a second plurality of driver images;
    determining, by the at least one processor, that the second plurality of driver images depict the first driver;
    combining, by the at least one processor, the second plurality of driver images with the first plurality of driver images so that the representative image is selected from the combined plurality of driver images; and
    adding the combined plurality of driver images and the associated driver identifier to a fleet-specific training dataset, wherein training the fleet-specific model is further based on the fleet-specific training dataset.

4. The method of claim 3, wherein determining that the second plurality of driver images depict the first driver further comprises:
    determining, by the at least one processor, a distance in an embedding space between the embedding space projection of a first driver image from the first plurality of driver images of the first driver and embedding space projection of a second driver image from the second plurality of driver images, wherein the distance indicates that the embedding space projection of the second driver image overlaps with the at least one image cluster.

5. The method of claim 3, wherein determining that the second plurality of driver images depict the first driver further comprises:
receiving, by the at least one processor, non-biometric driver login data, wherein the non-biometric driver login data is the same for the first and second plurality of driver images.

6. The method of claim 3, wherein determining that the second plurality of driver images depict the first driver further comprises:
processing, by the at least one processor and with a neural network trained to determine whether two images depict the same person or different people, a first driver image from the first plurality of driver images of the first driver and a second driver image from the second plurality of driver images.

7. The method of claim 3, wherein determining that the second plurality of driver images depict the first driver further comprises:
processing, by the at least one processor and with a fleet-specific neural network, a second driver image from the second plurality of driver images, wherein the fleet-specific neural network was trained to determine whether an image depicts a driver in the vehicle fleet.

8. The method of claim 7, wherein the fleet-specific neural network is configured to take an embedding space projection of a driver image as input.

9. The method of claim 8, wherein the fleet-specific neural network is further configured to take a vehicle identifier as input.

10. The method of claim 1, further comprising:
displaying, in response to the user selecting a driver image from a displayed plurality of driver images, a driver-identifier selection interface, wherein the driver-identifier selection interface comprises a list of selectable options, each option corresponding to a driver from a predetermined group of drivers.

11. The method of claim 10, further comprising:
receiving, by the at least one processor, a driver-identifier, wherein the driver-identifier was selected by the user from the driver-identifier selection interface; and
associating, by at least one processor, a plurality of linked driver-image clusters with the driver-identifier, wherein each driver-image cluster of the plurality of linked driver-image clusters is linked directly or indirectly to a root driver-image cluster to which the user-selected driver image belongs.

12. The method of claim 11, wherein the list of selectable options comprises a list of candidate driver-identifiers, each driver-identifier of the list of candidate driver-identifiers selected for inclusion based on non-biometric driver login data associated with at least one driver-image cluster of the plurality of linked driver image clusters.

13. The method of claim 1, further comprising:
sampling images corresponding to the gaze direction, and wherein the first plurality of driver images comprises the sampled images.

* * * * *